United States Patent
Kalarot et al.

(10) Patent No.: US 12,412,089 B2
(45) Date of Patent: *Sep. 9, 2025

(54) SUPERVISED LEARNING TECHNIQUES FOR ENCODER TRAINING

(71) Applicant: Adobe Inc., San Jose, CA (US)

(72) Inventors: Ratheesh Kalarot, San Jose, CA (US); Wei-An Lin, San Jose, CA (US); Cameron Smith, Santa Cruz, CA (US); Zhixin Shu, San Jose, CA (US); Baldo Faieta, San Francisco, CA (US); Shabnam Ghadar, Menlo Park, CA (US); Jingwan Lu, Santa Clara, CA (US); Aliakbar Darabi, Seattle, WA (US); Jun-Yan Zhu, San Jose, CA (US); Niloy Mitra, London (GB); Richard Zhang, San Francisco, CA (US); Elya Shechtman, Seattle, WA (US)

(73) Assignee: Adobe Inc., San Jose, CA (US)

(*) Notice: Subject to any disclaimer, the term of this patent is extended or adjusted under 35 U.S.C. 154(b) by 944 days.

This patent is subject to a terminal disclaimer.

(21) Appl. No.: 17/384,378

(22) Filed: Jul. 23, 2021

(65) Prior Publication Data
US 2022/0121932 A1 Apr. 21, 2022

Related U.S. Application Data

(60) Provisional application No. 63/092,980, filed on Oct. 16, 2020.

(51) Int. Cl.
*G06N 3/08* (2023.01)
*G06F 3/04845* (2022.01)
(Continued)

(52) U.S. Cl.
CPC ........... *G06N 3/08* (2013.01); *G06F 3/04845* (2013.01); *G06F 3/04847* (2013.01);
(Continued)

(58) Field of Classification Search
None
See application file for complete search history.

(56) References Cited

U.S. PATENT DOCUMENTS 9,129,190 B1 * 9/2015 Ranzato ............... G06V 10/82
9,373,057 B1 * 6/2016 Erhan ................. G06F 18/214
(Continued)

FOREIGN PATENT DOCUMENTS

CN 110796080 A 2/2020
EP 3872747 A1 9/2021

OTHER PUBLICATIONS

U.S. Appl. No. 17/384,273 entitled "Identity Preserving Techniques for Generative Adversarial Network Projection", filed Jul. 23, 72 pages.
(Continued)

*Primary Examiner* — Maikhanh Nguyen
(74) *Attorney, Agent, or Firm* — Kilpatrick Townsend & Stockton LLP

(57) ABSTRACT

Systems and methods train an encoder neural network for fast and accurate projection into the latent space of a Generative Adversarial Network (GAN). The encoder is trained by providing an input training image to the encoder and producing, by the encoder, a latent space representation of the input training image. The latent space representation is provided as input to the GAN to generate a generated training image. A latent code is sampled from a latent space associated with the GAN and the sampled latent code is provided as input to the GAN. The GAN generates a synthetic training image based on the sampled latent code.

(Continued)

The sampled latent code is provided as input to the encoder to produce a synthetic training code. The encoder is updated by minimizing a loss between the generated training image and the input training image, and the synthetic training code and the sampled latent code.

18 Claims, 14 Drawing Sheets
(5 of 14 Drawing Sheet(s) Filed in Color)

(51) Int. Cl.

| | |
|---|---|
| G06F 3/04847 | (2022.01) |
| G06F 18/21 | (2023.01) |
| G06F 18/211 | (2023.01) |
| G06F 18/214 | (2023.01) |
| G06F 18/40 | (2023.01) |
| G06N 3/045 | (2023.01) |
| G06N 20/20 | (2019.01) |
| G06T 3/02 | (2024.01) |
| G06T 3/18 | (2024.01) |
| G06T 3/40 | (2006.01) |
| G06T 3/4038 | (2024.01) |
| G06T 3/4046 | (2024.01) |
| G06T 5/20 | (2006.01) |
| G06T 5/77 | (2024.01) |
| G06T 11/00 | (2006.01) |
| G06T 11/60 | (2006.01) |
| G06V 10/28 | (2022.01) |
| G06V 10/98 | (2022.01) |

(52) U.S. Cl.
CPC .......... *G06F 18/211* (2023.01); *G06F 18/214* (2023.01); *G06F 18/2163* (2023.01); *G06F 18/40* (2023.01); *G06N 3/045* (2023.01); *G06N 20/20* (2019.01); *G06T 3/02* (2024.01); *G06T 3/18* (2024.01); *G06T 3/40* (2013.01); *G06T 3/4038* (2013.01); *G06T 3/4046* (2013.01); *G06T 5/20* (2013.01); *G06T 5/77* (2024.01); *G06T 11/001* (2013.01); *G06T 11/60* (2013.01); *G06V 10/28* (2022.01); *G06V 10/98* (2022.01); *G06T 2207/10024* (2013.01); *G06T 2207/20081* (2013.01); *G06T 2207/20084* (2013.01); *G06T 2207/20221* (2013.01); *G06T 2210/22* (2013.01)

(56) References Cited

U.S. PATENT DOCUMENTS

| | | | |
|---|---|---|---|
| 10,373,055 | B1 | 8/2019 | Matthey-de-l'Endroit et al. |
| 10,430,946 | B1 * | 10/2019 | Zhou ................. A61B 5/02007 |
| 10,671,838 | B1 | 6/2020 | Bogan et al. |
| 10,825,219 | B2 | 11/2020 | Fu et al. |
| 10,902,571 | B2 | 1/2021 | Naruniec et al. |
| 11,200,638 | B2 | 12/2021 | He et al. |
| 11,222,466 | B1 | 1/2022 | Naruniec et al. |
| 11,227,187 | B1 | 1/2022 | Weinberger |
| 11,354,792 | B2 | 6/2022 | Fisher et al. |
| 11,354,823 | B2 * | 6/2022 | Lerchner ................. G06N 3/045 |
| 11,494,667 | B2 | 11/2022 | Carbune et al. |
| 11,508,167 | B2 * | 11/2022 | Deng ...................... G06N 3/08 |
| 11,521,362 | B2 | 12/2022 | Bondich et al. |
| 11,544,880 | B2 | 1/2023 | Park et al. |
| 11,557,022 | B2 | 1/2023 | Munkberg et al. |
| 11,580,673 | B1 | 2/2023 | Ren et al. |
| 11,610,435 | B2 | 3/2023 | Karras et al. |
| 11,676,014 | B1 | 6/2023 | Hallac |
| 11,682,199 | B2 | 6/2023 | Karras et al. |
| 11,797,769 | B1 | 10/2023 | Gangadharaiah et al. |
| 11,875,221 | B2 | 1/2024 | Lin et al. |
| 11,880,766 | B2 | 1/2024 | Smith et al. |
| 11,907,839 | B2 | 2/2024 | Kalarot et al. |
| 11,915,133 | B2 | 2/2024 | Kalarot et al. |
| 11,978,268 | B2 * | 5/2024 | Deng ...................... G06F 30/20 |
| 11,983,628 | B2 | 5/2024 | Lin et al. |
| 12,327,188 | B2 | 6/2025 | Kalarot et al. |
| 12,333,427 | B2 | 6/2025 | Smith et al. |
| 2012/0301023 | A1 | 11/2012 | Braun et al. |
| 2015/0063450 | A1 | 3/2015 | Kim et al. |
| 2015/0277686 | A1 | 10/2015 | Laforge et al. |
| 2015/0371422 | A1 | 12/2015 | Kokemohr |
| 2018/0225812 | A1 | 8/2018 | Diverdi et al. |
| 2018/0247201 | A1 | 8/2018 | Liu et al. |
| 2018/0314716 | A1 | 11/2018 | Kim et al. |
| 2019/0171908 | A1 | 6/2019 | Salavon |
| 2019/0172243 | A1 | 6/2019 | Mishra et al. |
| 2019/0213772 | A1 | 7/2019 | Lombardi et al. |
| 2019/0294108 | A1 | 9/2019 | Ozcan et al. |
| 2019/0295302 | A1 | 9/2019 | Fu et al. |
| 2019/0378242 | A1 | 12/2019 | Zhang et al. |
| 2019/0385064 | A1 | 12/2019 | Malaya |
| 2020/0034455 | A1 | 1/2020 | Chandra Sekar Rao et al. |
| 2020/0089755 | A1 * | 3/2020 | Shazeer ................ G06F 18/285 |
| 2020/0134778 | A1 | 4/2020 | He et al. |
| 2020/0151559 | A1 | 5/2020 | Karras et al. |
| 2020/0242771 | A1 | 7/2020 | Park et al. |
| 2020/0242774 | A1 | 7/2020 | Park et al. |
| 2020/0250471 | A1 | 8/2020 | Saruta et al. |
| 2020/0349393 | A1 * | 11/2020 | Zhong ................... G06N 3/084 |
| 2020/0372297 | A1 | 11/2020 | Terjek |
| 2020/0372370 | A1 * | 11/2020 | Donahue ................ G06N 3/084 |
| 2020/0372621 | A1 | 11/2020 | Naruniec et al. |
| 2020/0380338 | A1 | 12/2020 | Matsumura |
| 2021/0019541 | A1 | 1/2021 | Wang et al. |
| 2021/0142177 | A1 * | 5/2021 | Mallya ................... G06N 3/084 |
| 2021/0182687 | A1 | 6/2021 | Son et al. |
| 2021/0209464 | A1 | 7/2021 | Bala et al. |
| 2021/0271867 | A1 | 9/2021 | Liu et al. |
| 2021/0279513 | A1 | 9/2021 | Jie |
| 2021/0283717 | A1 | 9/2021 | Iyer et al. |
| 2021/0319209 | A1 * | 10/2021 | Deng ...................... G06V 10/82 |
| 2021/0327038 | A1 | 10/2021 | Helminger et al. |
| 2021/0334935 | A1 | 10/2021 | Grigoriev et al. |
| 2021/0374402 | A1 | 12/2021 | Kim et al. |
| 2022/0044352 | A1 | 2/2022 | Liao et al. |
| 2022/0051479 | A1 | 2/2022 | Agarwal et al. |
| 2022/0076374 | A1 | 3/2022 | Li et al. |
| 2022/0084173 | A1 | 3/2022 | Liang et al. |
| 2022/0084204 | A1 | 3/2022 | Li et al. |
| 2022/0108163 | A1 | 4/2022 | Sokhandan Asl |
| 2022/0121876 | A1 | 4/2022 | Kalarot et al. |
| 2022/0121931 | A1 | 4/2022 | Kalarot et al. |
| 2022/0121932 | A1 | 4/2022 | Kalarot et al. |
| 2022/0122221 | A1 | 4/2022 | Smith et al. |
| 2022/0122222 | A1 | 4/2022 | Smith et al. |
| 2022/0122232 | A1 * | 4/2022 | Lin ...................... G06F 3/04845 |
| 2022/0122305 | A1 * | 4/2022 | Smith ................. G06F 3/04847 |
| 2022/0122306 | A1 | 4/2022 | Lin et al. |
| 2022/0122307 | A1 * | 4/2022 | Kalarot ................. G06F 18/211 |
| 2022/0122308 | A1 | 4/2022 | Kalarot et al. |
| 2022/0138897 | A1 | 5/2022 | Singh et al. |
| 2022/0148244 | A1 | 5/2022 | Ko et al. |
| 2022/0156886 | A1 | 5/2022 | Petrangeli et al. |
| 2022/0198266 | A1 | 6/2022 | Chakraborty et al. |
| 2022/0254071 | A1 | 8/2022 | Ojha et al. |
| 2022/0309672 | A1 | 9/2022 | Cherian et al. |
| 2022/0366193 | A1 | 11/2022 | Luo et al. |
| 2023/0094954 | A1 | 3/2023 | Sinha et al. |
| 2023/0195281 | A1 | 6/2023 | Charlton et al. |
| 2023/0214953 | A1 | 7/2023 | Yoo |

OTHER PUBLICATIONS

U.S. Appl. No. 17/384,283 entitled "Multi-Scale Output Techniques for Generative Adversarial Networks", filed Jul. 23, 2021, 72 pages.

(56) References Cited

OTHER PUBLICATIONS

U.S. Appl. No. 17/384,357 entitled "Techniques for Domain to Domain Projection Using a Generative Model", filed Jul. 23, 2021, 72 pages.
U.S. Appl. No. 17/384,371 entitled "Direct Regression Encoder Architecture and Training", filed Jul. 23, 2021, 66 pages.
Abdal et al., "Image2StyleGAN: How to Embed Images Into the StyleGAN Latent Space?", arXiv:1904.03189v2 [cs.CV], Sep. 3, 2019, 23 pages.
Gao et al, "Res2Net: A New Multi-scale Backbone Architecture", arXiv:1904.01169v3 [cs.CV], Jan. 27, 2021, 11 pages.
Goodfellow et al., "Generative Adversarial Nets", arXiv:1406.2661v1 [stat.ML], Jun. 10, 2014, 9 pages.
He et al., "Deep Residual Learning for Image Recognition", arXiv:1512.03385v1 [cs.CV], Dec. 10, 2015, 12 pages.
Karras et al., "A Style-Based Generator Architecture for Generative Adversarial Networks", arXiv:1812.04948v3 [cs.NE], Mar. 29, 2019, 12 pages.
Minaee et al., "Image Segmentation Using Deep Learning: A Survey", arXiv:2001.05566v5 [cs.CV], Nov. 15, 2020, 22 pages.
Richardson et al., "Encoding in Style: a StyleGAN Encoder for Image-to-Image Translation", arXiv:2008.00951v1 [cs.CV], Aug. 3, 2020, 16 pages.
Wiles et al., "Using Bottlenecks in Feedforward Networks as a Dimension Reduction Technique: An Application to Optimization Tasks", Neural Computation 8, 1179-1183, 1996, Downloaded from http://direct.mit.edu/neco/article-pdf/8/6/1179/813336/neco.1996.8.6.1179.pdf on Apr. 28, 2021, 5 pages.
Non-Final Office Action, mailed Dec. 7, 2023, U.S. Appl. No. 17/384,273, 12 pages.
Corrected Notice of Allowability, mailed Nov. 30, 2023, U.S. Appl. No. 17/384,357, 2 pages.
Corrected Notice of Allowability, mailed Dec. 13, 2023, U.S. Appl. No. 17/468,476, 2 pages.
Corrected Notice of Allowability, mailed Dec. 14, 2023, U.S. Appl. No. 17/468,511, 2 pages.
Supplemental Notice of Allowance, mailed Dec. 4, 2023, U.S. Appl. No. 17/468,546, 2 pages.
Kapusta et al., "Facial Appearance Modifications Using Skpca-derived Features Extracted From Convolutional Autoencoder's Latent Space", 2020 International Joint Conference on Neural Networks (IJCNN), (Jul. 1, 2020).
Corrected Notice of Allowability, mailed Nov. 17, 2023, U.S. Appl. No. 17/468,476, 2 pages.
Notice of Allowance, mailed Nov. 13, 2023, U.S. Appl. No. 17/468,511, 10 pages.
Supplemental Notice of Allowability, mailed Nov. 17, 2023, U.S. Appl. No. 17/468,546, 2 pages.
Gur et al., "Hierarchical Patch Vae-gan: Generating Diverse Videos From a Single Sample", Advances in Neural Information Processing Systems, vol. 33, Available online at: https://doi.org/10.48550/arXiv.2006.12226, 2020, pp. 16761-16772.
Kalarot et al., "Component Attention Guided Face Super-Resolution Network: Cagface", Proceedings of the IEEE/CVF Winter Conference on Applications of Computer Vision, 2020.
Karnewar et al., "Msg-gan: Multi-scale Gradients for Generative Adversarial Networks", Proceedings of the IEEE/CVF Conference on Computer Vision and Pattern Recognition, Available online at: https://doi.org/10.48550/arXiv.1903.06048, 2020, pp. 1-18.
Kohl et al., "A Hierarchical Probabilistic U-net for Modeling Multi-scale Ambiguities", Available Online At: https://doi.org/10.48550/arXiv.1905.13077, May 30, 2019, pp. 1-25.
Yi et al., "Bsd-gan: Branched Generative Adversarial Network for Scale-disentangled Representation Learning and Image Synthesis", IEEE Transactions on Image Processing, vol. 29, Available Online At: https://ieeexplore.ieee.org/document/9165961, 2020, pp. 9073-9083.
Zhang et al., "Nested Scale-editing for Conditional Image Synthesis", Proceedings of the IEEE/CVF Conference on Computer Vision and Pattern Recognition, Available Online At: https://arxiv.org/abs/2006.02038, Jun. 3, 2020, pp. 1-18.
"A Stylemap-Based Generator for Real-Time Image Projection and Local Editing", ICLR 2021, 13 pages.
Deng et al., "ArcFace: Additive Angular Margin Loss for Deep Face Recognition", arXiv:1801.07698v3 [cs.CV], Feb. 9, 2019, 11 pages.
Huang et al., "Arbitrary Style Transfer in Real-time with Adaptive Instance Normalization", Department of Computer Science & Cornell Tech, Cornell University, 10 pages.
Karras et al., "Progressive Growing of Gans for Improved Quality, Stability, and Variation", ICLR, arXiv:1710.10196v3 [cs.NE], Feb. 26, 2018, p. 26.
Karras et al., "Analyzing and Improving the Image Quality of StyleGAN", arXiv:1912.04958v2 [cs.CV], Mar. 23, 2020, 21 pages.
Pidhorskyi et al., "Adversarial Latent Autoencoders", arXiv:2004.04467v1 [cs.LG], Apr. 9, 2020, 10 pages.
Rajarapollu et al., "Bicubic Interpolation Algorithm Implementation for Image Appearance Enhancement" IJCST vol. 8, Issue 2, Apr.-Jun. 2017, 4 pages.
Shen et al., "InterFaceGAN: Interpreting the Disentangled Face Representation Learned by GANs", arXiv:2005.09635v2 [cs.CV], Oct. 29, 2020, 16 pages.
Simonyan et al., "Very Deep Convolutional Networks for Large-Scale Image Recognition", arxiv:1409.1556v6 [cs.CV], Apr. 10, 2015, 14 pages.
Zhang et al., "The Unreasonable Effectiveness of Deep Features as a Perceptual Metric", pp. 586-595, 10 pages.
Zhu et al., "Generative Visual Manipulation on the Natural Image Manifold", arXiv:1609.03552v2 [cs.CV], Sep. 25, 2016, 16 pages.
Zhu et al., "In-Domain GAN Inversion for Real Image Editing", arXiv:2004.00049v3 [cs.CV], Jul. 16, 2020, 31 pages.
Abdal et al., "StyleFlow: Attribute-conditioned Exploration of StyleGAN-Generated Images using Conditional Continuous Normalizing Flows", arXiv:2008.02401v2 [cs.CV], Sep. 20, 2020, 22 pages.
Abdulnabi et al., "Multi-task CNN Model for Attribute Prediction", arXiv:1601.00400v1 [cs.CV], Jan. 4, 2016, 11 pages.
Karim, Raimi "Intuitions on L1 and L2 Regularisation", Towards Data Science, Dec. 26, 2018, 11 pages.
Pang et al., "Image-to-Image Translation: Methods and Applications," arXiv:2101.08629v1 [cs.CV], Jan. 21, 2021, 19 pages.
Tewari, et al. "StyleRig: Rigging StyleGAN for 3D Control over Portrait Images", 13 pages.
Zhu et al., "Generative Visual Manipulation on the Natural Image Manifold", arXiv:1609.03552v3 [cs.CV], Dec. 16, 2018.
Biswas et al., "Spatially Variant Laplacian Pyramids for Multi-Frame Exposure Fusion," arXiv:2002.01425v1, Feb. 4, 2020, 10 pages.
Burt et al., "The Laplacian Pyramid as a Compact Image Code," IEE Transactions on Communications vol. Com-31, No. 4, Apr. 1983, pp. 532-540.
Dahlke et al., "Multiscale Approximation," Understanding Complex Systems, 2007, 35 pages.
Glasbey et al., "A Review of Image Warping Methods," Journal of Applied Statistics 25, 1998, pp. 155-171.
Karasaridis et al., "A Filter Design Technique for Steerable Pyramid Image Transforms," Proc. Int'l Conf Acoustics Speech Signal Processing (ICASSP) IV, 1996, pp. 2387-2390.
Khabarlak et al., "Fast Facial Landmark Detection and Applications: A Survey," arXiv:2101.10808 (2021).
Smith et al., "Alpha and the History of Digital Compositing," Technical Memo 7, Microsoft Corporation, Aug. 15, 1995, 10 pages.
Wu et al., "Towards fitting a 3D dense facial model to a 2D image: A landmark-free approach", 8 pages.
Zou et al., "Object Detection in 20 Years: A Survey," arXiv:1905.05055 May 16, 2019, 39 pages.
"Basics of Affine Transformation," Neutrium, https://neutrium.net/mathematics/basics-of-affine-transformation/ (2012).
Notice of Allowance, mailed Oct. 12, 2023, U.S. Appl. No. 17/384,357, 9 pages.
Notice of Allowance mailed Oct. 6, 2023, U.S. Appl. No. 17/468,476, 9 pages.

(56) References Cited

OTHER PUBLICATIONS

Notice of Allowance mailed Nov. 2, 2023, U.S. Appl. No. 17/468,546, 10 pages.
Huang et al., "Arbitrary Style Transfer in Real-time with Adaptive Instance Normalization", Proceedings of the IEEE International Conference on Computer Vision, 2017, pp. 1501-1510.
Zhang et al., "The Unreasonable Effectiveness of Deep Features as a Perceptual Metric", Proceedings of the IEEE International Conference on Computer Vision, 2018, pp. 586-595, 10 pages.
Wiles et al., "Using Bottlenecks in Feedforward Networks as a Dimension Reduction Technique: An Application to Optimization Tasks", Neural Computation 8, 1996, pp. 1179-1183.
Tewari, et al. "StyleRig: Rigging StyleGAN for 3D Control over Portrait Images", arXiv:2004.0012v2, Jun. 13, 2020, 13 pages.
Wu et al, "Towards fitting a 3D dense facial model to a 2D image: A landmark-free approach", 2015 IEEE 7th International Conference on Biometrics Theory, Applications and Systems (BTAS), 2015, 8 pages.
Advisory Action, mailed Jul. 5, 2024, U.S. Appl. No. 17/384,273, 5 pages.
Non-Final Office Action, mailed Aug. 28, 2024, U.S. Appl. No. 17/384,273, 14 pages.
Final Office Action, mailed Sep. 10, 2024, U.S. Appl. No. 17/384,283, 10 pages.
U.S. Appl. No. 17/384,283, "Non-Final Office Action", Feb. 29, 2024, 9 pages.
U.S. Appl. No. 17/468,487, "Notice of Allowance", Mar. 6, 2024, 14 pages.
U.S. Appl. No. 17/468,511, "Corrected Notice of Allowability", Jan. 12, 2024, 2 pages.
U.S. Appl. No. 17/468,546, "Supplemental Notice of Allowability", Jan. 18, 2024, 2 pages.
Brock et al., "Neural Photo Editing with Introspective Adversarial Networks", Published as a conference paper at ICLR 2017, 2017, 15 pages.
Heinrich, "Photo Editing with Generative Adversarial Network (Part 2)", Available Online at: https://developer.nvidia.com/blog/photo-editing-generative-adversarial-networks-2/, Apr. 24, 2017, 8 pages.
Notice of Allowance, mailed Jul. 7, 2023, U.S. Appl. No. 17/384,357, 13 pages.
Non-Final Office Action, mailed Jun. 22, 2023, U.S. Appl. No. 17/468,476, 15 pages.
Hahn et al., "Disentangling Latent Factors of Variational Auto-Encoder with Whitening", Artificial Neural Networks and Machine Learning—ICANN, 2019, pp. 590-603.
Liu et al., "Towards Disentangling Latent Space for Unsupervised Semantic Face Editing", IEEE, Trans Image Process, 2022, 14 pages.
Zhu et al., "Generative Visual Manipulation on the Natural Image Manifold", arXiv:1609.03552 [cs.CV], Dec. 16, 2018, 16 pages.
U.S. Appl. No. 17/384,273, "Final Office Action", Mar. 26, 2024, 16 pages.
U.S. Appl. No. 17/384,283, "Final Office Action", Mar. 26, 2024, 20 pages.
U.S. Appl. No. 17/468,487, "Notice of Allowability", Apr. 11, 2024, 11 pages.
U.S. Appl. No. 17/468,487, "Notice of Allowability", Apr. 3, 2024, 11 pages.
Hou et al., "Deep Feature Similarity for Generative Adversarial Networks", 4th International Association for Pattern Recognition Asian Conference on Pattern Recognition (ACPR), Nov. 2017, pp. 115-119.
Corrected Notice of Allowability for U.S. Appl. No. 17/384,283, mailed Mar. 26, 2025, 2 pages.
Corrected Notice of Allowability for U.S. Appl. No. 17/384,371, mailed Mar. 12, 2025, 2 pages.
Non-Final Office Action for U.S. Appl. No. 17/468,498, mailed Mar. 26, 2025, 29 pages.
Gulrajani et al., "Improved Training of Wasserstein GANs", Proceedings of the 31st International Conference on Neural Information Processing Systems, Dec. 4, 2017, pp. 5769-5779.
Haerkoenen et al., "GANSpace: Discovering Interpretable GAN Controls", 34th Conference on Neural Information Processing Systems, Jul. 2020, pp. 1-10.
He et al., "AttGAN: Facial Attribute Editing by Only Changing What You Want", Institute of Electrical and Electronics Engineers Transactions on Image Processing, vol. 28, No. 11, May 20, 2019, pp. 1-16.
Jadon, "A Survey of Loss Functions for Semantic Segmentation", Institute of Electrical and Electronics Engineers Conference on Computational Intelligence in Bioinformatics and Computational Biology, Sep. 3, 2020, 6 pages.
Khodadadeh et al., "Latent to Latent: A Learned Mapper for Identity Preserving Editing of Multiple Face Attributes in StyleGAN-generated Images", Proceedings of the Institute of Electrical and Electronics Engineers/CVF Winter Conference on Applications of Computer Vision, 2022, pp. 3184-3192.
Kramer et al., "InterFace: A Software Package for Face Image Warping, Averaging, and Principal Components Analysis", Behavior Research Methods, vol. 49, Dec. 7, 2016, pp. 2002-2011.
Li et al., "GAN Compression: Efficient Architectures for Interactive Conditional GANs", Proceedings of the Institute of Electrical and Electronics Engineers/CVF Conference on Computer Vision and Pattern Recognition, Jun. 2020, pp. 5284-5294.
Vanrullen et al., "Reconstructing Faces from fMRI Patterns using Deep Generative Neural Networks", Communications Biology, vol. 2, No. 193, May 21, 2019, pp. 1-10.
Final Office Action, mailed Feb. 12, 2025, U.S. Appl. No. 17/384,273, 17 pages.
Notice of Allowance, mailed Feb. 26, 2025, U.S. Appl. No. 17/384,283, 10 pages.
Non-Final Office Action, mailed Oct. 21, 2024, U.S. Appl. No. 17/384,371, 31 pages.
Notice of Allowance, mailed Feb. 26, 2025, U.S. Appl. No. 17/384,371, 13 pages.
Li et al., "Facial Attribute Editing by Latent Space Adversarial Variational Autoencoders", 24th International Conference on Pattern Recognition (ICPR), Aug. 20-24, 2018, pp. 1337-1342.
Mardani et al., "Deep Generative Adversarial Neural Networks for Compressive Sensing (GANCS) MRI", Institute of Electrical and Electronics Engineers Transactions on Medical Imaging, vol. 38, No. 1, Jan. 2019, pp. 167-179.
Wang et al., "Enhancing HEVC Spatial Prediction by Context-based Learning", ICASSP 2019—2019 Institute of Electrical and Electronics Engineers International Conference on Acoustics, Speech and Signal Processing (ICASSP), May 12-17, 2019, 6 pages.
U.S. Appl. No. 17/468,498, Final Office Action, Mailed on Aug. 6, 2025, 19 pages.
Yao et al., "Learning Non-linear Disentangled Editing for Stylegan", 2021 Institute of Electrical and Electronics Engineers International Conference on Image Processing (ICIP), Aug. 2021, 5 pages.

* cited by examiner

800

```
┌─────────────────────────────────────────────────────────────────┐
│ PROVIDE A THIRD INPUT TRAINING IMAGE AS INPUT TO THE ENCODER    │
│ NEURAL NETWORK TO PRODUCE A LATENT SPACE REPRESENTATION OF THE  │
│ THIRD INPUT TRAINING IMAGE                                      │
│                              802                                │
└─────────────────────────────────────────────────────────────────┘
                                  │
                                  ▼
┌─────────────────────────────────────────────────────────────────┐
│ GENERATE A THIRD GENERATED TRAINING IMAGE BY PROVIDING THE      │
│ LATENT SPACE REPRESENTATION OF THE THIRD INPUT TRAINING IMAGE   │
│ AS INPUT TO THE GENERATOR NEURAL NETWORK                        │
│                              804                                │
└─────────────────────────────────────────────────────────────────┘
                                  │
                                  ▼
┌─────────────────────────────────────────────────────────────────┐
│ MINIMIZE A LOSS BETWEEN THE THIRD INPUT TRAINING IMAGE AND THE  │
│ THIRD GENERATED TRAINING IMAGE TO OPTIMIZE THE LATENT SPACE     │
│ REPRESENTATION OF THE THIRD INPUT TRAINING IMAGE                │
│                              806                                │
└─────────────────────────────────────────────────────────────────┘
                                  │
                                  ▼
┌─────────────────────────────────────────────────────────────────┐
│ SAMPLE A THIRD LATENT CODE FROM THE LATENT SPACE BY RANDOMLY    │
│ SAMPLING IN A NEIGHBORHOOD OF THE OPTIMIZED LATENT SPACE        │
│ REPRESENTATION OF THE THIRD INPUT TRAINING IMAGE                │
│                              808                                │
└─────────────────────────────────────────────────────────────────┘
                                  │
                                  ▼
┌─────────────────────────────────────────────────────────────────┐
│ RETRAIN THE ENCODER NEURAL NETWORK USING THE THIRD SAMPLED      │
│ LATENT CODE                                                     │
│                              810                                │
└─────────────────────────────────────────────────────────────────┘
```

```
┌─────────────────────────────────────────────────────────────────────────┐
│ PROVIDE AN INPUT TRAINING IMAGE TO A SEGMENTATION NEURAL NETWORK TO     │
│ GENERATE A SEGMENTED INPUT TRAINING IMAGE                               │
│ 902                                                                     │
└─────────────────────────────────────────────────────────────────────────┘
                                    ↓
┌─────────────────────────────────────────────────────────────────────────┐
│ PROVIDE THE INPUT TRAINING IMAGE AS INPUT TO AN ENCODER NEURAL NETWORK  │
│ TO PRODUCE A LATENT SPACE REPRESENTATION OF THE INPUT TRAINING IMAGE    │
│ 904                                                                     │
└─────────────────────────────────────────────────────────────────────────┘
                                    ↓
┌─────────────────────────────────────────────────────────────────────────┐
│ PROVIDE THE LATENT SPACE REPRESENTATION OF THE INPUT TRAINING IMAGE AS  │
│ INPUT TO A GENERATOR NEURAL NETWORK TO GENERATE A GENERATED TRAINING    │
│ IMAGE                                                                   │
│ 906                                                                     │
└─────────────────────────────────────────────────────────────────────────┘
                                    ↓
┌─────────────────────────────────────────────────────────────────────────┐
│ PROVIDE THE GENERATED TRAINING IMAGE AS INPUT TO THE SEGMENTATION       │
│ NEURAL NETWORK TO GENERATE A SEGMENTED GENERATED TRAINING IMAGE         │
│ 908                                                                     │
└─────────────────────────────────────────────────────────────────────────┘
                                    ↓
┌─────────────────────────────────────────────────────────────────────────┐
│ COMPUTE A LOSS BASED UPON THE SEGMENTED GENERATED TRAINING IMAGE AND    │
│ THE SEGMENTED INPUT TRAINING IMAGE                                      │
│ 910                                                                     │
└─────────────────────────────────────────────────────────────────────────┘
                                    ↓
┌─────────────────────────────────────────────────────────────────────────┐
│ UPDATE THE ENCODER NEURAL NETWORK (E.G., UPDATE WEIGHTS ASSOCIATED WITH │
│ NODES OF THE ENCODER NEURAL NETWORK) BY MINIMIZING THE LOSS DETERMINED  │
│ AT 910                                                                  │
│ 912                                                                     │
└─────────────────────────────────────────────────────────────────────────┘
```

FIG. 9

SUPERVISED LEARNING TECHNIQUES FOR ENCODER TRAINING

CROSS-REFERENCE TO RELATED APPLICATIONS

This application is a non-provisional application of and claims the benefit of the filing date of U.S. Provisional Application 63/092,980, filed on Oct. 16, 2020, which is herein incorporated by reference in its entirety for all purposes.

This application is related to the concurrently filed application titled "Direct Regression Encoder Architecture and Training," which is herein incorporated by reference in its entirety for all purposes.

This application is also related to the concurrently filed applications titled "Identity-Preserving Techniques for Generative Adversarial Network Projection," "Multi-Scale Output Techniques for Generative Adversarial Networks" and "Techniques for Domain to Domain Projection Using a Generative Model," which are herein incorporated by reference in their entirety for all purposes.

TECHNICAL FIELD

This disclosure generally relates to image editing techniques. More specifically, but not by way of limitation, this disclosure relates to encoder architecture and training techniques for improved speed and quality image projection, e.g., for use with a generative adversarial network for image editing.

BACKGROUND

Many image editing tools provide features that enable a user to edit or modify an image. Some of these tools even use machine learning-based techniques for editing images. However, the image editing capabilities of such existing tools are quite limited—the recreation of images is not accurate, the editing is limited to low-resolution images (e.g., 256×256) (i.e., large high resolution images cannot be processed at all or cannot be processed in a reasonable time frame for the desired end result), unwanted effects are introduced into the recreated images, and other deficiencies.

Some image editing tools use machine learning models such as Generative Adversarial Networks (GANs) to generate edited images. While GANs have been successful in generating high quality edited images, existing techniques using GANs still have several shortcomings. Some existing techniques generate a n-dimensional vector representation of an input image which can then be edited and used to generate an output image. The process of generating the vector representation can take a long time, such as several seconds or even minutes, which is not acceptable for several applications. Further, prior systems tend to generate an output edited image that is blurry and/or undesirable in appearance (e.g., does not appear like a photorealistic human face, as is desired if the input image is a digital photograph of a human face).

SUMMARY

The present disclosure describes techniques for editing images to efficiently generate realistic and accurate edited images. More particularly, new and improved techniques are described for applying and training an encoder with specialized architecture for improved speed and quality image projection, e.g., for use with a generative adversarial network for image editing.

In some embodiments, a computer-implemented method for training an encoder neural network includes providing an input training image as input to the encoder neural network, the encoder neural network implemented by one or more computing systems, producing, by the encoder neural network, a latent space representation of the input training image, providing the latent space representation of the input training image produced by the encoder neural network as input to a generator neural network, the generator neural network implemented using the one or more computing systems, generating, by the generator neural network, a generated training image based upon the latent space representation of the input training image, sampling a latent code from a latent space associated with the generator neural network, providing the sampled latent code as input to the generator neural network, generating, by the generator neural network, a synthetic training image based on the sampled latent code, providing the sampled latent code as input to the encoder neural network, producing, by the encoder neural network, a synthetic training code based upon the sampled latent code, and updating the encoder neural network by minimizing a loss between the generated training image and the input training image, and the synthetic training code and the sampled latent code.

In some aspects, the loss between the generated training image and the input training image is weighted by a first value, and the loss between the synthetic training code and the sampled latent code is weighted by a second value different from the first value.

In some aspects, sampling the latent code from the latent space includes sampling from a first latent space to obtain an initial latent code and transforming the initial latent code to an augmented latent space to generate the sampled latent code. In some aspects, the method further comprises sampling in a neighborhood of the transformed initial latent code to generate the sampled latent code.

In some aspects, the method further includes providing a second input training image as input to the encoder neural network to produce a latent space representation of the second input training image, sampling a second latent code from the latent space by sampling in a neighborhood of the latent space representation of the second input training image, and retraining the encoder neural network using the second sampled latent code.

In some aspects, the method further includes providing a third input training image as input to the encoder neural network to produce a latent space representation of the third input training image, generating a third generated training image by providing the latent space representation of the third input training image as input to the generator neural network, minimizing a loss between the latent space representation of the third input training image and the third generated training image to optimize the latent space representation of the third input training image, sampling a third latent code from the latent space by sampling in a neighborhood of the optimized latent space representation of the third input training image, and retraining the encoder neural network using the third sampled latent code.

In some aspects, retraining the encoder neural network using the third sampled latent code includes providing the third sampled latent code as input to the generator neural network to generate a third synthetic training image, providing the third synthetic training image as input to the encoder neural network to produce a third synthetic training code, and updating the encoder neural network by minimizing a loss between the third generated training image and the third input training image, and the third synthetic training code and the third sampled latent code.

In some embodiments, a computing system includes a processor and a non-transitory computer-readable medium comprising instructions which, when executed by the processor, perform processing including providing an input training image as input to an encoder neural network, the encoder neural network implemented by one or more computing systems, producing, by the encoder neural network, a latent space representation of the input training image, providing the latent space representation of the input training image produced by the encoder neural network as input to a generator neural network, the generator neural network implemented using the one or more computing systems, generating, by the generator neural network, a generated training image based upon the latent space representation of the input training image, providing a sampled latent code as input to the generator neural network, generating, by the generator neural network, a synthetic training image based on the sampled latent code, providing the sampled latent code as input to the encoder neural network, producing, by the encoder neural network, a synthetic training code based upon the sampled latent code, and updating the encoder neural network by minimizing a loss between the generated training image and the input training image, and the synthetic training code and the sampled latent code.

In some embodiments, a non-transitory computer-readable medium having instructions stored thereon, the instructions executable by a processing device to perform operations including obtaining an input training image from a database and a step for training an encoder neural network by minimizing a loss as a function of both the input training image and a synthetic training code generated by the encoder neural network.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 8 depicts an example of a process for multi-stage encoder training according to certain embodiments of the present disclosure.

FIG. 9 depicts a flowchart of an example process for training an encoder using segmentation loss according to certain embodiments of the present disclosure.

DETAILED DESCRIPTION

Figure 1:
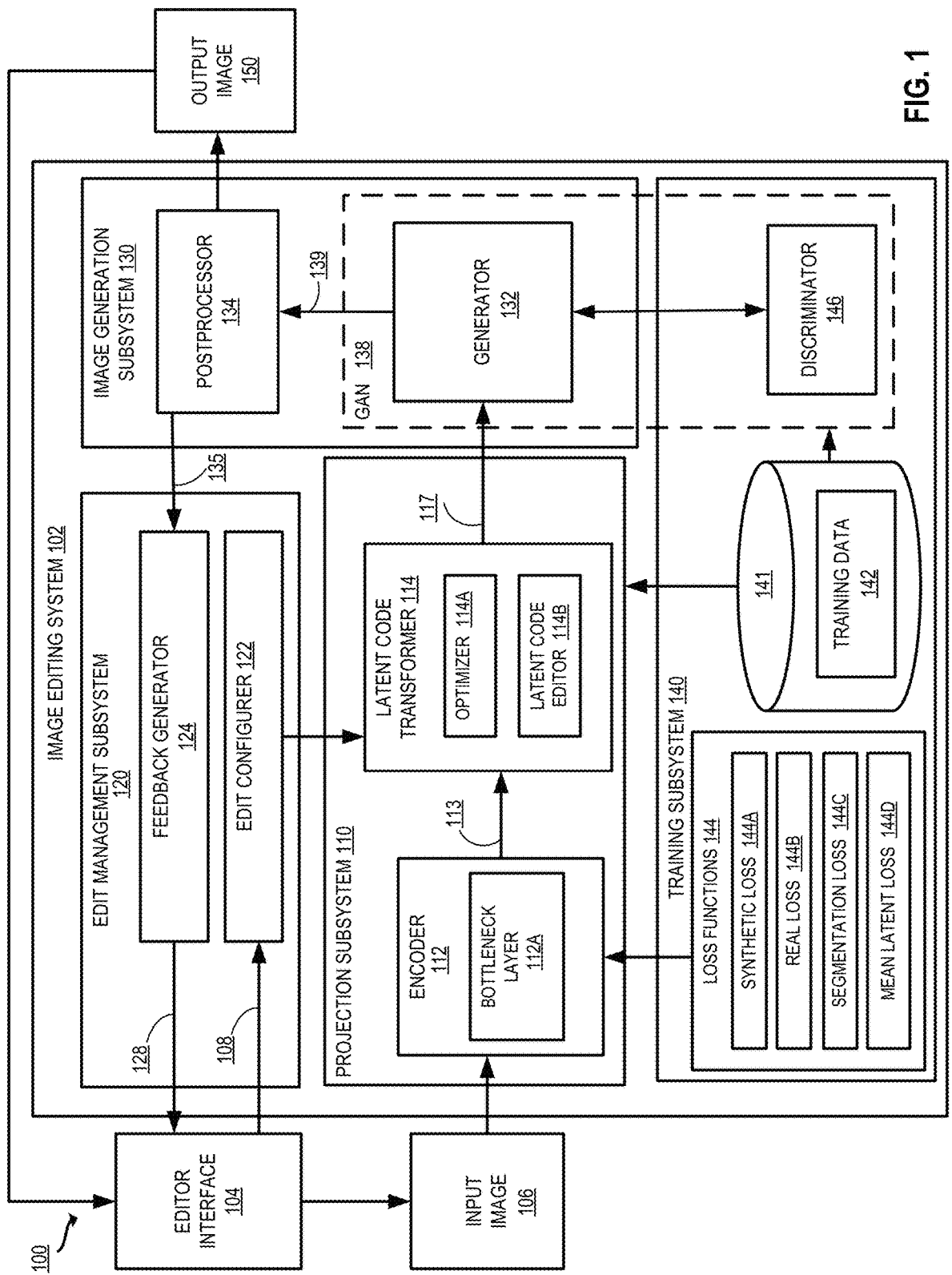
FIG. 1 depicts an example of a computing environment for image projection and editing according to certain embodiments of the present disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes improved image representation and editing technique. More specifically, improved techniques are described for generating improved n-dimensional vector or matrix representations (referred to as a latent space representation) of input images with improved speed and accuracy. Edits to be made to an image can then be applied to the latent space representation of the image, and the edited latent space representation can then be used to generate a higher quality edited output image. In certain embodiments, new and improved techniques are described for applying and training an encoder with specialized architecture for improved speed and quality image projection, e.g., for use with a generative adversarial network for image editing.

GAN Inversion, or projection, is the problem converting an image to a latent code. A latent code is an N-dimensional vector or matrix representing a point in the "latent space" of a GAN. The latent space may, for example, be a hypersphere made up of variables drawn from a Gaussian distribution. In a training phase of the GAN, the generator neural network of the GAN learns to map points in the latent space to specific output images. Such interpretation by the generator neural network gives structure to the latent space, which varies according to the generator used. For a given generator neural network, the latent space structure can be analyzed and traversed to control image generation. A latent code corresponds to a point sampled from the latent space. When a latent code is provided as input to a generator neural network (e.g., comprised in the GAN), the generator neural network outputs an image. To project the input image into the latent space, the input image is input to an encoder neural network, which outputs a particular latent code corresponding to that input image (referred to as a "latent space representation" of that image). The encoder neural network is trained such that given an image, it produces a latent code that, when input to the generator neural network, appears as close as possible to that original image.

In certain embodiments, the disclosed techniques include new and improved machine learning-based techniques for generating a latent space representation of an image, which can then be edited and used to generate an edited version of the image. For example, techniques are described for using neural networks to efficiently generate realistic and accurate images. In certain embodiments, an encoder neural network is described to generate improved latent space representations of input images and a generator neural network is further described (e.g., part of a Generative Adversarial Network (GAN)) that can efficiently generate realistic and accurate output images from the latent space representations.

In certain embodiments, an input image is obtained to be edited, along with specified edits. For example, an input image of a human face is uploaded, along with edit parameters such as increasing the apparent age of the depicted face by 20 years, making the expression on the face change to smile, turning the head by a certain amount, etc. To make edits to the input image, a latent space representation is generated. This latent space representation can be manipulated (e.g., using vector addition or other techniques), such that an output edited image generated using the latent space representation reflects the specified edits.

Using an encoder neural network, the latent space representation w of an input image x is produced such that the image G(w) generated by the generator neural network is similar to the input image x. The latent space representation of the input image is an n-dimensional vector in n-dimensional space, where each n-dimensional vector represents a point in the n-dimensional space and each n-dimensional vector is represented by an ordered n-tuple of numbers.

After generating a latent space representation of an input image, the latent space representation may be edited. For example, for an input image (e.g., an image of a person's face) to which edits are to be applied (e.g., that face it to be aged (made to appear older), the face is to be edited to add a smile, etc.), the improved techniques described herein are used to generate an improved latent space representation of the input image. If an edit is to be made to the input image, the edit to be made is translated to changes to be made to one or more numbers in the latent space vector representing the input image. The edited latent space representation of the input image is then processed by the generator neural network to generate an edited image, where the edited image replicates the original input image (e.g., the face depicted in the original input image), with any applied edits (e.g., made to look older, added a smile, etc.).

As noted above, various machine learning models are popularly used to generate and edit realistic images, but these existing techniques suffer from shortcomings such as long processing times and unwanted divergences between the appearance of the input image and the appearance of the output image. Some prior systems use an encoder to generate a latent space representation of an input image (also referred to as projecting the input image to a latent space representation). In addition to the unwanted divergences, due to the architecture of the encoder and the training techniques applied, the projection process can take several seconds or even several minutes, failing to provide real-time results. Further, in prior systems, overfitting can be a problem in encoder training, which can both increase the time for encoder training and runtime, as well as creating undesirable results (e.g., blurry or unclear images and other divergences from the original image).

Different GANs may be associated with different latent spaces. For example, in StyleGAN, a GAN popularly used for image generation and editing, images are typically projected into a first latent space, Z space. (See Karras et al., "A Style-Based Generator Architecture for Generative Adversarial Networks", https://arxiv.org/pdf/1812.04948.pdf (2019) ("StyleGAN")). In the Z space, if the latent space representation of an image is changed by a particular amount or in a particular direction, this does not provide predictable changes in the appearance of the ultimate output image. The Z space is "entangled" in that the images corresponding to two nearby latent codes are not necessarily similar. W space is another latent space of StyleGAN. W space has 512 dimensions and less disentangled, in that two points close together to one another in W space, when input to a generator, will produce images that look similar (e.g., for images of a human face, the output images will appear to be of the same person). Moreover, due to this disentangled structure of W space, a direction in W space can be discovered that corresponds to a change in a target attribute (e.g., to make a face depicted in an image look older or younger, to make a tree depicted in an image have a different type of leaves, and so forth). StyleGAN is further associated with an extended latent space, referred to as $W_p$ space or W+ space. $W_p$ space is a concatenation of 18 different 512-dimensional W vectors, one for each layer of the StyleGAN architecture that can receive input via AdaIn. (See, e.g., Abdal et. al., "Image2StyleGAN: How to Embed Images Into the StyleGAN Latent Space?," arXiv: 1904.03189 (2019)). The $W_p$ space is similar to the W space in that the points in the $W_p$ space are disentangled and directions in $W_p$ space can be identified for targeted image attribute editing. Moreover, $W_p$ space provides improved results over W space in part because many images cannot be recreated accurately from a latent space representation in W space. By using multiple styles for different layers of the GAN, $W_p$ space provides increased flexibility and superior results.

Accordingly, it is advantageous to transform the latent space representation of an image from the Z space to W space and/or $W_p$ space. Traditionally, a latent code is learned in Z space (e.g., using optimization). The Z space latent code is mapped to W space using a mapping network. Traditionally, to arrive at a $W_p$ space latent code, the Z space code is first mapped to W space then augmented to $W_p$ space with an additional transformation. Other techniques use optimization to learn a $W_p$ space representation of an input image, but this can be time-consuming and error-prone given the size of $W_p$ space. The aim is to predict a continuous value function multiple times, which is computationally difficult (e.g., predicting 512×18 continuous values).

Traditional techniques cannot regress directly from Z space to $W_p$ space using an encoder, given overfitting and other issues. Existing techniques for identifying a latent space representation of an image in $W_p$ space can be expensive in terms of time and computational resources given the need for multiple transformations and/or optimization in high-dimensional space. Thus, it is desirable to be able to directly regress on $W_p$ space using an encoder. However, using conventional techniques, good results are unlikely. Training on a higher dimensional space is a more difficult process (e.g., compared to training in Z or W space) in terms of computational requirements, time, and accuracy. Existing training techniques, such as the ones discussed above, also tend to generate output results that are either blurry or do not appear adequately similar to input image (e.g., for an input photograph, the output image may not appear photorealistic, or for an input image of a person, the output image may appear like a different person). The techniques described herein address these shortcomings and others.

According to certain implementations described herein, techniques are described for improving the speed of projection, along with the clarity and accuracy of the ultimate output image, using a specialized encoder architecture with a bottleneck layer that enables direct regression to the extended $W_p$ latent space of a GAN.

Techniques are further provided for training the encoder using specialized loss functions to reduce blurriness and increase realism in the ultimate output image (e.g., an edited output image generated by a generator neural network using the latent space representation). The encoder architecture and training techniques, alone or in combination, can be used to generate images faster and with improved appearance, as compared to prior techniques.

The following non-limiting examples are provided to introduce certain embodiments. In these examples, an image editing system projects an input image into the latent space of a GAN, resulting in a latent space representation of the image. Edits to be made to the input image may be made by editing this latent space representation of the input image (e.g., using vector arithmetic or another neural network). The edited latent space representation is provided as input to a GAN, which processes the edited latent space representation and generates an output edited image, where the edited image reflects the input image with the desired edits made to the input image. For example, an image of a human face can be edited so that the face appears to smile, look older or younger, turn the head to a different angle, and so forth.

In one example, the image editing system uses a specialized encoder with a specialized architecture (e.g., a bottleneck layer) that is capable of directly producing a high-dimensional latent space representation (e.g., corresponding to the extended latent space $W_p$). The image editing system obtains an input image to be edited. For example, a user may upload an image to be edited to the image editing system. The image editing system provides the input image as input to the specialized encoder neural network. The encoder neural network produces a latent space representation of the input image as output.

The encoder neural network includes an input layer, a feature extraction layer, multiple intermediate layers between the input layer and the feature extraction layer, and a bottleneck layer positioned after the feature extraction layer. The bottleneck layer is a layer that contains fewer nodes than the previous layer. The input to the encoder neural network may be a high-dimensional image (e.g., a high-resolution image cropped to 1024×1024 pixels). When provided as input to the encoder neural network, the dimensionality of the input image is reduced to extract features in the form of a relatively high-dimensional vector representation. The bottleneck layer is applied to reduce this dimensionality in a targeted fashion. For example, it has been found that applying a 256 node bottleneck layer to a feed forward neural network backbone can be used to generate a 256 length latent space representation of the input image, which is then augmented to directly regress (e.g., without use of a mapping network) to a 512×18 dimensional latent space representation of the input image in the $W_p$ space.

The image editing system then provides the latent space representation of the input image generated by the encoder neural network as input to a generator neural network. The generator neural network is configured to generate an output image using the latent space representation. In some implementations, the latent space representation is first modified, based on configured edits, such that the edits will be reflected in the output image (e.g., to make a person depicted in the image appear to change expression, age, gender, etc.). The latent space representation, in original or edited form, is input to the generator neural network. The output of the generator neural network is a high-resolution image, for example, an output image with 1024×1024 pixels.

The use of a feed forward encoder neural network with a bottleneck layer provides multiple advantages. First, using a feed forward network provides faster compute times as compared to more complex encoder architectures. Further, by regressing directly into the $W_p$ space rather than applying multiple transformations, further improvements in speed and reduction in use of computational resources are provided. For example, the input image is processed by the feed forward encoder and the generator neural network to generate the output image in less than about ten milliseconds, compared to several seconds or even minutes in prior systems.

In a second example, the image editing system applies a new supervised learning method involving joint real and synthetic image supervision. For example, the encoder is trained using a new loss function that includes a component for real image supervision (training the encoder on an actual image) as well as a component for synthetic image supervision (training the encoder on an image generated based on a code selected from the latent space). Joint real and synthetic image supervision has been found to reduce both blurriness and unwanted divergences (e.g., for an input photorealistic image, the output is not photorealistic) in the ultimate output image.

In some embodiments, the image editing system performs a real image based supervised learning technique using an input training image that is, for example, a digital photograph. The image editing system provides the input training image as input to an encoder neural network. For example, the image editing system provides the input training image to the specialized encoder with a bottleneck layer described above. Alternatively, other encoder architectures can be implemented. The encoder takes the input training image as input and outputs a latent space representation of the input training image.

The image editing system provides the latent space representation of the input training image as input to a generator neural network. Based on the input training image, the generator neural network generates a generated training image. This generated training image and the input training image are used to compute a real loss component of a loss function for training the encoder.

The image editing system further uses a synthetic image based supervised learning technique using a "synthetic image" generated by the generator neural network using a latent code sampled from the latent space. The image editing system samples a latent code from the latent space. For example, from the N-dimensional latent space, a point is randomly sampled, which corresponds to a N-dimensional vector representation of a random synthetic image. A latent code can be sampled from the latent space randomly or based on a mean value of latent codes in the latent space. This latent code is provided as input to the generator neural network, which then generates a synthetic training image based on the sampled latent code.

The image editing system provides the synthetic training image as input to the encoder neural network, and the encoder neural network produces a synthetic training code. The synthetic training code is, e.g., a vector in the latent space. This synthetic training code and the sampled latent code are used to compute a synthetic loss component for training the encoder.

The image editing system computes an overall loss, where the overall loss includes the synthetic loss component and the real loss component. The overall loss is represented by a loss function. For example, a loss function is computed based on a difference between the generated training image and the input training image (representing the real loss component) and the synthetic training code and the sampled latent code (representing the synthetic loss component). This overall loss is then minimized to train the encoder. For example, the overall loss is iteratively computed and minimized as part of training the encoder neural network by adjusting weights associated with the neurons in the encoder neural network until convergence is achieved. The resulting trained encoder is then trained to generate latent codes that produce images with improved results (e.g., the image clarity is clear, the resolution is high, and the output image appears photorealistic).

Accordingly, as described herein, certain embodiments provide improvements to computing environments by solving problems that are specific to computer-implemented image editing environments. These improvements include the use of an encoder with a bottleneck layer to project a latent space representation that is directly regressed into the extended latent space to enable improved speed and editability. These improvements further include using joint real and synthetic image supervision to improve clarity and realism in the ultimate output image. Together or separately, these techniques significantly improve the results of image projection and editing.

Example of an Operating Environment for Image Projection and Editing

FIG. 1 depicts an example of a computing environment 100 including an image editing system 102 that provides capabilities for editing electronic content such as digital photos and images. For example, as depicted in FIG. 1, the image editing system 102 may receive as inputs an input image 106 that is to be edited and one or more edits to be made to the input image 106. The image editing system 102 is configured to edit the input image 106 per the edits and generate an output image 150 that is an edited representation of the input image 106 and incorporates the edits.

There are various ways in which the input image 106 and the edits to be made are input to the image editing system 102. In the example depicted in FIG. 1, the image editing system 102 may provide an editor interface 104 that a user may use to provide inputs regarding the input image 106 to be edited and the one or more edits (e.g., edit parameters 108 to be made to the input image 106). The image editing system 102 then generates an edited output image 150 by applying the user-provided edits to the input image 106. In certain embodiments, the edited output image 150 may be presented or output to the user using the editor interface 104.

In some embodiments, the editor interface 104 may include one or Graphical User interfaces (GUIs) that enable a user to provide inputs identifying the input images, identifying the edits to be made to be made, setting configuration parameters for the image editing system 102, and the like. For example, a GUI may include one or more user-selectable elements that enable a user to input images 106 to be edited. One or more GUIs provided by the editor interface 104 may include one or more upload elements for uploading content (e.g., an upload field to upload an image to be edited). In some implementations, the editor interface 104 responds to user selection of an upload element by transitioning to a view showing available files to upload, prompt a user to take a photo, or the like.

One or more GUIs provided by the editor interface 104 may also include user-selectable elements that enable a user to specify the edits or modifications to be performed. For example, a GUI may display one or more sliders that can be manipulated by the user, each slider corresponding to an attribute of the image to be edited. Other elements provided by the GUIs may include text entry fields, buttons, pull-down menus, and other user-selectable options. In certain implementations, the editor interface 104 may be part of a content editing software such as Adobe Photoshop®, which is capable of receiving and editing digital content (e.g., digital photographs or other images).

In some embodiments, the image editing system 102 and the editor interface 104 execute on a computing device, which may be used by a user. Examples of a computing device include, but are not limited to, a personal computer, a tablet computer, a desktop computer, a processing unit, any combination of these devices, or any other suitable device having one or more processors. In some other embodiments, the image editing system 102 and the editor interface 104 may operate on different computing systems, which may be communicatively coupled to each other. Examples of computer platform and implementations that may be used to implement the image editing system 102 are depicted in FIGS. 15 and 16 and described below.

The image editing system 102 may comprise multiple subsystems, which work in cooperation to generate edited output images 150. In the embodiment depicted in FIG. 1, the image editing system 102 comprises a projection subsystem 110, a training subsystem 140, an edit management subsystem 120, and an image generation subsystem 130. Computing environment 100 depicted in FIG. 1 is merely an example and is not intended to unduly limit the scope of claimed embodiments. Many variations, alternatives, and modifications are possible. For example, in some implementations, the image editing system 102 may have more or fewer subsystems than those shown in FIG. 1, may combine two or more subsystems, or may have a different configuration or arrangement of subsystems. The various systems, subsystems, and other components depicted in FIG. 1 may be implemented in software (e.g., code, instructions, program) only executed by one or more processing units (e.g., processors, cores) of the respective systems, using hardware only, or combinations thereof. The software may be stored on a non-transitory storage medium (e.g., on a memory device).

The various subsystems of the image editing system 102 can be implemented in the same computing system or different, independently operated computing systems. For example, the edit management subsystem 120 could be a separate entity from the projection subsystem 110, the image generation subsystem 130, and the training subsystem 140, or the same entity. The image editing system 102 may execute on a server separately from the editor interface 104, or other embodiments can involve the image editing system 102 being built into a software application executing the editor interface 104 on a user device.

One or more of the subsystems of the image editing system 102 include trained machine learning models or include components that use machine learning models that have been trained. For example, in the embodiment depicted in FIG. 1, the training may be performed by a training subsystem 140, which may perform the training using various training data 142. In some implementations, the training subsystem 140 includes, or is communicatively coupled to, one or more data storage units 141 for storing the training data 142.

An edit management subsystem 120 configures edits to the input image 106 using an edit configurer 122 and a feedback generator 124. A projection subsystem 110 generates a latent space representation 113 representing the input image 106. A latent code transformer 114 generates a modified latent space representation 117 by applying one or more transformations, including the edits configured by the edit management subsystem 120, to the latent space representation 113 of the input image. An image generation subsystem 130 includes a generator 132 that generates an image according to the transformed latent space representation 117. In some aspects, the image generation subsystem 130 further includes a postprocessor 134 that performs postprocessing of the generated image 139 to produce the output image 150, which may be returned to the editor interface 104. In some embodiments, the training subsystem 140 trains one or more components of the latent code transformer 114 using the training data 142. In some implementations, the training subsystem 140 trains the generator 132 using a discriminator 146. In some implementations, the training subsystem 140 trains the encoder 112 and/or components of the latent code transformer 114 using one or more loss functions 144.

The edit management subsystem 120 includes hardware and/or software configured to control image edits. The edit management subsystem 120 includes an edit configurer 122 and a feedback generator 124. The edit configurer 122 receives edit parameters 108, e.g., editor-configured modification instructions, from the editor interface 104. For example, edit parameters 108 may specify that an image of a person should be modified to include red hair and glasses. The edit configurer 122 transmits an indication of the edit parameters 108 to the latent code transformer 114 of the projection subsystem 110 for further processing.

The feedback generator 124 prepares and transmits edit feedback 128 to the editor interface 104. Examples of such edit feedback 128 includes metrics showing how much an attribute is being modified (e.g., numerical values showing the selected edit parameters 108). Alternatively, or additionally, the edit feedback 128 includes preview images showing how the output image will appear given the current edit parameters.

The projection subsystem 110 includes hardware and/or software configured to identify and transform latent space representations of images. The projection subsystem 110 receives as input the input image 106 and generates as output a modified latent space representation of the input image 117, which is a vector string of numbers reflecting edits to be applied to the input image 106.

In some implementations, the projection subsystem 110 includes an encoder 112 configured to receive an input image 106, project the input image 106 into a latent space representation 113, and output the latent space representation 113. The projection subsystem 110 further includes and a latent code transformer 114 for performing modifications to the latent space representation 113 to generate a modified latent space representation 117.

In some implementations, the encoder 112 is a machine learning model that has been trained to discover a latent space representation of the input image 106. The latent space representation (also referred to as semantic latent code or latent code) is a string of numbers (e.g., a n-dimensional vector, containing a value for each of the n-dimensions) that, when provided as input to the generator, creates a particular image (e.g., to replicate the input image 106). The encoder 112 is a machine learning model trained to generate such a latent space representation. The encoder 112 may, for example, be a neural network trained to encode the input image 106. Given an input image 106 and a generator 132, the encoder discovers a latent space representation of the input image w, such that when the latent space representation of the input image w is input to the generator 132, the resulting generated image 139 perceptually resembles the target input image 106.

In some embodiments, the encoder 112 includes an input layer, a feature extraction layer, and a bottleneck layer 112A. The encoder 112 may include a backbone that includes the input layer and the feature extraction layer, along with multiple intermediate layers. In some implementations, the encoder 112 is a feed forward neural network. The encoder 112 may include residual blocks. A residual block is made up of multiple convolutional layers with a skip connection. In some implementations, the residual block includes three convolutional layers followed by a batch normalization layer and a ReLU activation function. In some implementations, the backbone is, or is similar to, the ResNet-50 network, which is a 50 layer convolutional neural network using residual blocks, as described in detail in He et al., "Deep Residual Learning for Image Recognition," *Proceedings of the IEEE Conference on Computer Vision and Pattern Recognition (CVPR)*, pp. 770-778 (2015).

The bottleneck layer 112A is positioned after the feature extraction layer. The bottleneck layer 112A is configured to take as input a vector representation of features extracted from the feature extraction layer, and produce a reduced-dimensionality vector as output. The use of the bottleneck layer has been found to reduce overfitting and enable direct regression into high-dimensional space (e.g., $W_p$ space), as described herein.

The latent code transformer 114 includes functionality to optimize and/or edit the latent space representation 113 to generate the modified latent space representation 117. In some aspects, the latent code transformer 114 includes an optimizer 114A and a latent code editor 114B.

The optimizer 114A includes functionality to optimize the latent space representation of an input image. In some aspects, the optimizer 114A takes an initial latent space representation and optimizes the latent space representation according to one or more loss functions. The loss is minimized to modify the latent space representation 113 to increase the similarity between the ultimate output image 150 and the original input image 106.

The latent code editor 114B applies changes to the latent space representation 113 (e.g., after optimization performed by the optimizer 114A), based upon edit parameters received from the edit configurer 122. For example, the latent code editor 114B applies linear and/or nonlinear modifications to the latent space representation based on training indicating that these modifications will cause a desired change in the ultimate output image (e.g., to make a person depicted in an image appear to smile, be older, etc.).

Thus, the latent space representation 113 generated by the encoder 112 is processed by one or more components of the latent code transformer 114 to generate the modified latent space representation 117, which is passed to the image generation subsystem 130 for further processing.

In some embodiments, the image generation subsystem 130 includes hardware and/or software configured to generate an output image 150 based on input code (e.g., the modified latent space representation 117). The image generation subsystem includes a generator 132 and a postprocessor 134.

The generator 132 includes a machine learning model which has been trained to generate a generated image 139 based on input latent code. In some implementations, the generator 132 is a neural network. The generator 132 is pre-trained to generate data that is similar to a training set. Depending on the type of image to be edited by the image editing system 102, the generator may be trained to generate an image of a human face, a landscape, a dog, a cat, a shoe, and so forth. In some aspects, the generator 132 is trained to generate a specific type of image, as such targeted training can produce very realistic results. The generator 132 can produce a random new image (e.g., of a person that does not exist) based on random input (e.g., from a normal or Gaussian distribution). The generator can produce a new image that looks like an input image 106 using the techniques described herein and an input latent code that is generated based on the input image 106. In some implementations, the generator 132 is part of a Generative Adversarial Network (GAN) 138, and is trained in a zero-sum game with the discriminator 146.

In some embodiments, the postprocessor 134 ingests the generated image 139 and performs processing to prepare the output image 150. In some aspects, the projection subsystem 110 projects a portion of the input image 106 (e.g. a cropped region such as a face or a flower from within a larger image). In such cases, the generated image 139 is a subset of the input image 106, and the postprocessor 134 integrates the generated image 139 into the remaining portion of the input image 106 to generate the output image 150. Other post-processing performed by postprocessor 134 may include smoothing portions of the generated image 139, increasing or decreasing the pixel size of the generated image 139, and/or combining multiple generated images 119.

The training subsystem 140 includes hardware and/or software configured to train one or more machine learning models as used by the image editing system 102. The training subsystem 140 includes a discriminator 146. The discriminator 146 is part of the GAN 138 including the generator 132, and evaluates the output of the generator 132 to train the generator 132. The discriminator 146 compares images produced by the generator 132 to real images, and the generator 132 works to "trick" the discriminator into determining that a generated image is actually a real image. Such a competition between the discriminator 146 and the generator 132 teaches the generator to produce extremely realistic images. In some aspects, the training subsystem further includes functionality to train the latent code transformer 114 and/or postprocessor 134.

The training subsystem 140 further includes functionality to train the encoder 112, including one or more loss functions 144 that are minimized to train the encoder 112 to generate latent code that accurately represents the input image 106 and can be processed efficiently by the other elements of the projection subsystem 110. In some embodiments, these loss functions include a synthetic loss 144A, a real loss 144B, a segmentation loss 144C, and a mean latent loss 144D. These losses may be combined (e.g., as a loss function including a synthetic loss 144A component, a real loss 144B component, a segmentation loss 144C component, and a mean latent loss 144D component). Alternatively, or additionally, one loss can be used at a time, or a subset of the losses can be combined.

The synthetic loss 144A is a loss function or component of a loss function computed based on a latent code sampled from the latent space. For example, a latent code w (e.g., a vector corresponding to a point in the latent space) is randomly sampled from the latent space. Alternatively, or additionally, the latent code can be derived from a latent space representation of an input image (e.g., by sampling in a neighborhood of an encoded latent space representation of the input image). The synthetic loss 144A may further be a function of the output of providing the latent code to the generator 132 (G(w)) to generate a synthetic image and then providing the generated synthetic image to the encoder 112 (E(G(w))) to encode a latent code based upon the synthetic image. As a specific example, in some implementations, the synthetic loss 144A is a loss component given by $\|E(G(w))-w\|$, the normalized vector difference between the output of providing the latent code w to the generator, then the encoder, minus the latent code.

The real loss 144B is a loss function or loss component computed based on a real image. For example, the real loss 144B is a function of a real input training image x. The real loss 144B may further be a function of a generated image generated by providing the training image x as input to the encoder 112 to encode a latent space representation of the training image x, and that latent space representation is provided as input to the generator 132 to generate a generated training image. As a specific example, the real loss 144B is a loss component given by $\|G(E(x))-x\|$, the normalized vector difference of the generated training image and the input training image.

The segmentation loss 144C a loss function or component of a loss function that is computed based upon a segmented training image. The training subsystem 140 may apply a segmentation model to segment the training image. A segmentation model is a machine learning model trained to segment an image into different objects (e.g., tree, car, human face or parts of a human face, and so forth). In some aspects, the segmentation model assigns a label to each pixel for the corresponding object identified in the image. The segmentation loss, may, for example, be given by $$\text{Loss}=|S(G(w))-S(x)|,$$

where S(x) is the segmented input training image and S(G(w)) is a segmented image generated by the generator 132 (e.g., using a latent code w encoded by the encoder using the input training image x).

The mean latent loss 144D is a loss function or component of a loss function that is computed based upon a mean latent code. A mean latent code is an average latent code, which can be computed by applying an averaging function to the codes in the latent space. In some embodiments, the mean latent loss is given by $$\text{Loss}=|E(x)-w\_\text{mean}|,$$

where w_mean is the mean latent code and E(x) is a latent space representation of a training image encoded using the encoder 112.

The data storage unit 141 can be implemented as one or more databases or one or more data servers. The data storage unit 141 includes training data 142 that is used by the training subsystem 140 to train the engines of the image editing system 102. The training data 142 may include real images, synthetic images (e.g., as generated by the GAN), and/or latent space representations of the real and synthetic images.

Encoder Overview

Figure 2:
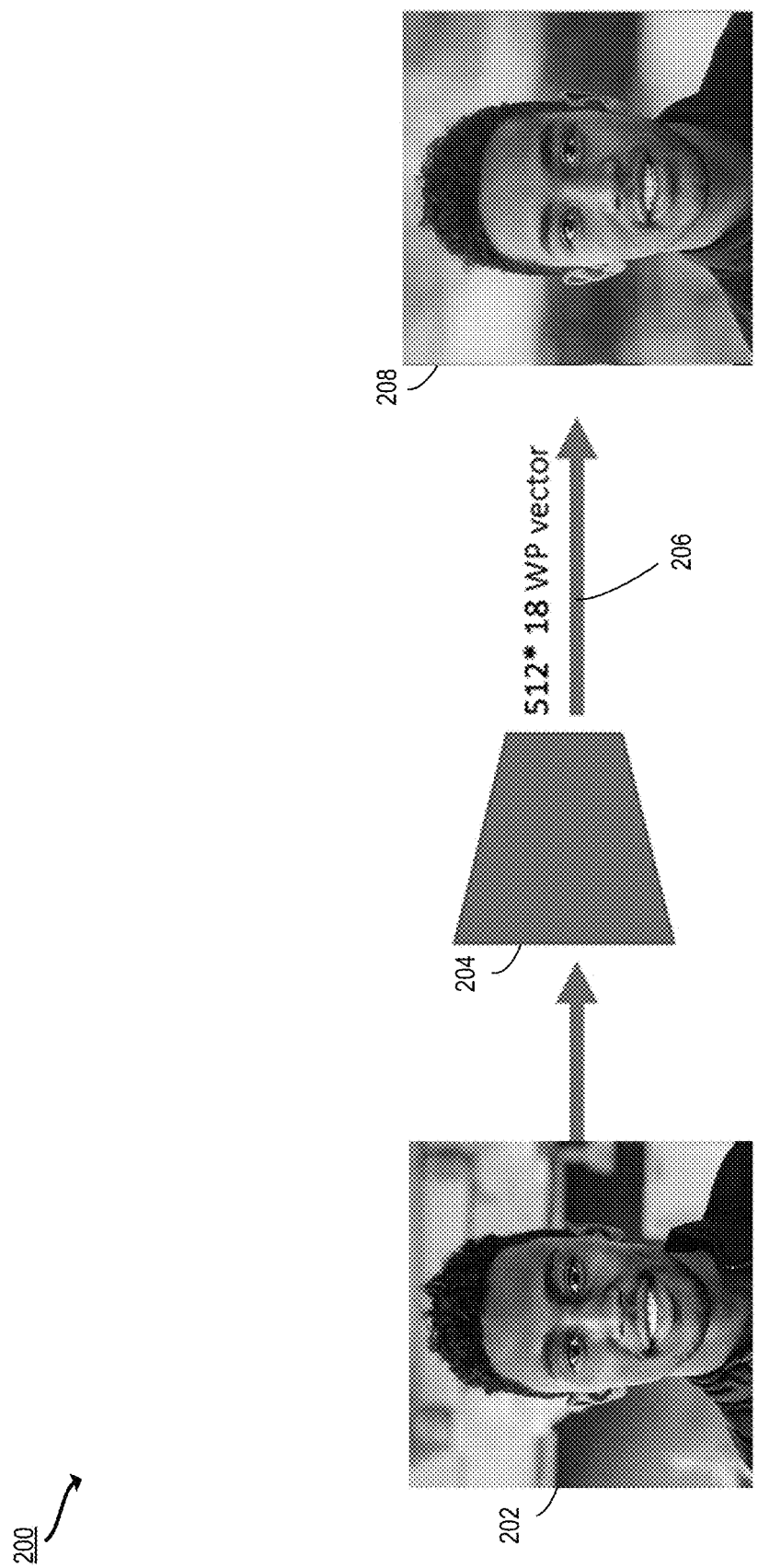
FIG. 2 depicts a schematic overview illustrating example use of a feed forward encoder to encode an input image to a high dimensional vector latent space representation according to certain embodiments of the present disclosure.

FIG. 2 illustrates a schematic diagram 200 illustrating an example use of an encoder neural network 204 to encode an input image 202 to a high dimensional vector latent space representation 206, which is then used to generate an output image 208.

As shown in FIG. 2, an input image 202 is obtained. The input image in this example is a cropped and aligned face image of 1024×1024 pixels (e.g., a relatively large cropped image). The input image 202 is provided as input to an encoder neural network 204. The encoder neural network 204 is a feed forward encoder neural network with a specialized architecture including a bottleneck layer. Using this specialized encoder, the system can generate a latent space representation of the input image 202 in the form of a 512×18 dimensional latent space representation 206, in the $W_p$ latent space. As described above, the $W_p$ space is a 512×18 dimensional latent space of the GAN that facilitates image editing using continuous properties of the latent space while providing accurate recreation for a wide range of images. Subsequently, the 512×18 dimensional latent space representation 206 is processed by a GAN to output an output image 208, which is a visualization of the $W_p$ vector. This encoder architecture and projection technique are described in further detail below with respect to FIGS. 3 and 4.

Example Techniques for Projection with Specialized Encoder

Figure 3:
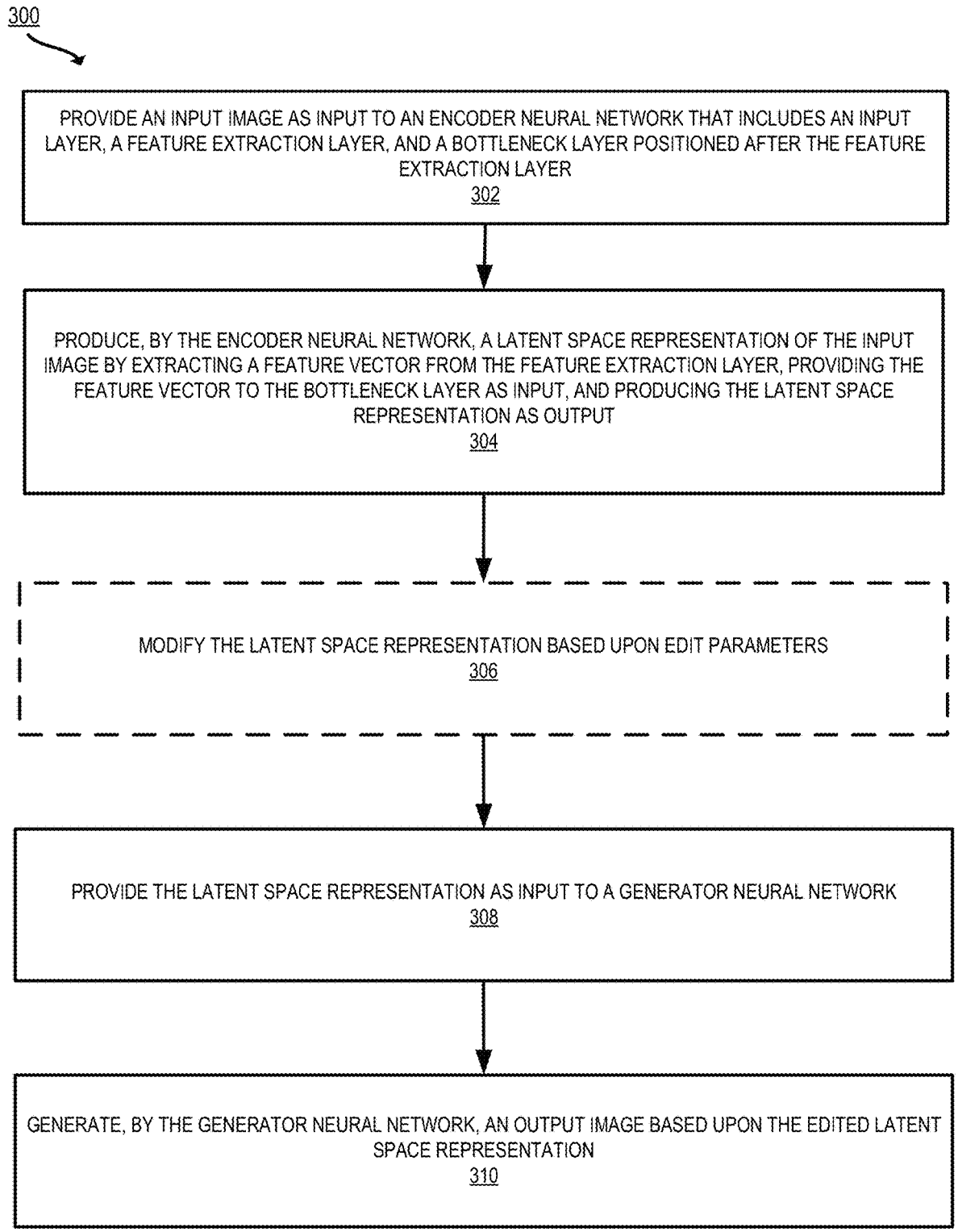
FIG. 3 depicts an example of a process for projecting an input image into the latent space using a specialized encoder according to certain embodiments of the present disclosure.

FIG. 3 illustrates an example process 300 for projecting an input image into a high-dimensional latent space using a specialized encoder, according to certain embodiments. The processing depicted in FIG. 3 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the processing may be performed in some different order or some steps may also be performed in parallel. In some implementations, one or more process blocks of FIG. 3 may be performed by an image editing system (e.g., the image editing system 102 of FIG. 1). In some implementations, one or more process blocks of FIG. 3 may be performed by another device or a group of devices separate from or including the image editing system 102 (e.g., the editor interface 104 executing on a user device).

In some embodiments, before the processing of the process 300, the image editing system (e.g., the projection subsystem of the image editing system) obtains an input image. For example, the projection subsystem receives an input image that is uploaded via the editor interface 104. The input image may be an image file that is to be edited (e.g., to change facial expression or age, or to adjust lighting or remove objects). Alternatively, or additionally, the projection subsystem may obtain the input image by retrieving the image from a local or remote database.

Figure 4:
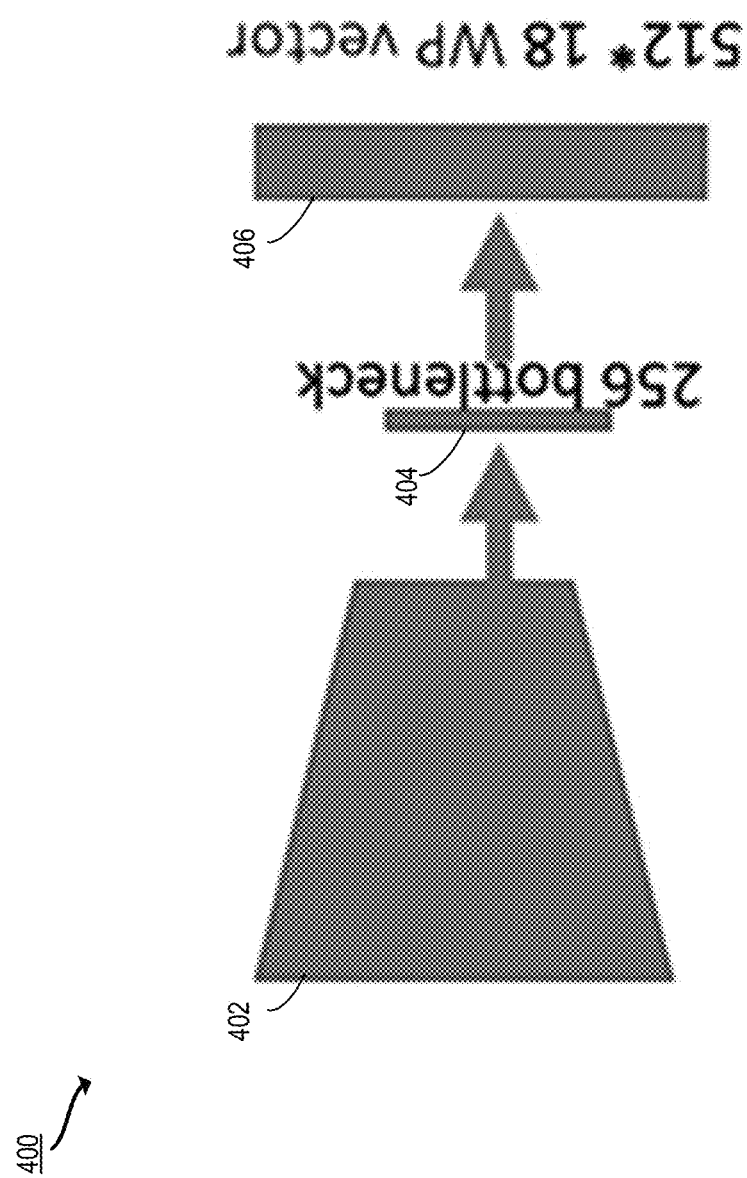
FIG. 4 depicts a simplified example of an encoder with a bottleneck layer for direct $W_p$ space regression according to certain embodiments of the present disclosure.

At 302, the projection subsystem provides the input image as input to an encoder neural network. The encoder neural network includes an input layer, a feature extraction layer, and a bottleneck layer positioned after the feature extraction layer. Features extracted from the feature extraction layer are input to the bottleneck layer. In some aspects, the bottleneck layer has 256 nodes and is configured to output a 256 length vector. In some aspects, the encoder neural network further includes a backbone which includes the input layer and the feature extraction layer. As described above with respect to FIG. 1, the backbone may include multiple intermediate nodes, convolutional layers, and/or residual blocks. In some implementations, a ResNet-50 network or portion thereof (see He, supra) is used as the backbone. The output of the feature extraction layer is a relatively high-dimensional vector. For example, ResNet-50 includes a Conv5 block, which produces a 7×7×2048 array representation of an input image. Traditionally, in ResNet-50 this array is input to a classifier layer for performing image classification tasks. In some implementations, instead of passing the output of the Conv5 block to a classifier layer, a max pooling layer is inserted after the Conv5 block of a network similar to ResNet-50. This converts the 7×7×2048 representation to a 2048 length vector representation. A simplified example of such an encoder neural network is shown in FIG. 4, including a backbone 402 and a bottleneck layer 404.

At 304, the projection subsystem produces, by the encoder neural network, a latent space representation of the input image by extracting a feature vector from the feature extraction layer, providing the feature vector to the bottleneck layer as input, and producing the latent space representation as output. The latent space representation has fewer dimensions than the feature vector. For example, as described above at 302, the feature extraction layer produces a 2048 length feature vector, and the bottleneck layer takes this feature vector as input and outputs a 256 length, reduced-dimensional vector as output. Extracting a feature vector may include obtaining output of a feature extraction layer of the encoder neural network (e.g., the Conv5 block of ResNet-50). Extracting the feature vector may further include providing the output of the feature extraction layer to another layer configured to reduce dimensionality. For example, the encoder further includes a maximum pooling layer after the feature extraction layer. The maximum pooling layer is configured to calculate the maximum value in the feature map (e.g., to convert a 7×7×2048 output of the Conv5 block of ResNet-50 to a 2048 length vector). In some implementations, the bottleneck layer produces an output that is about 10-15% the size of the input to the bottleneck layer (e.g., a 2048 length vector is input to the bottleneck layer and a 256 length vector is output from the bottleneck layer, providing an output that is 12.5% the size of the input). Such a reduction in size has been found to help mitigate overfitting issues.

In some embodiments, the feed forward encoder has a specialized architecture enabling direct regression into a high dimensional space. In some embodiments, the output of the bottleneck layer (e.g., a 256 length vector) is input to a series of fully connected layers to produce a 512×18 dimensional latent space representation of the input image. For example, the encoder architecture includes, after the bottleneck layer, one or more additional layers configured to produce a 512×18 dimensional latent space representation of the input image. The 256 length vector output of the bottleneck layer is provided as input to a series of learnable fully connected layers to produce a 512×18 $W_p$ latent space representation of the input image. This can be used to directly regress the input image into the extended latent space ($W_p$ space) of the GAN.

In some embodiments, at 306, the projection subsystem (e.g., the latent code editor of the projection subsystem) modifies the latent space representation based upon edit parameters. Edit parameters may, for example, be received via user input. As a specific example, a user may interact with sliders in a user interface to increase the age, amount of smile, tilt of the head, etc. in an image of a face. The projection subsystem can modify the latent space representation by applying linear or nonlinear modifications to the latent space representation of the input image, as described in U.S. Provisional Application 63/092,980. As an example, based on the topology of the $W_p$ space, a vector is discovered which, when added to the latent space representation, modifies the latent space representation such that the ultimate output image has a targeted modification (e.g., the edit parameters are reflected in the output image). For example, an image of a face is edited so that the face is smiling in the output image, or the person appears older, etc.

At 308, the image editing system (e.g., the image generation subsystem) provides the latent space representation as input to a generator neural network to generate an output image. For example, the projection subsystem transmits the edited latent space representation of the input image generated at 306 to the image generation subsystem. The image generation subsystem provides the edited latent space representation as input to a generator neural network (e.g., the generator 132 shown in FIG. 1). Alternatively, in some embodiments, editing the latent space representation at 308 is omitted, and the latent space representation produced by the encoder at 304 is provided to the generator neural network as input.

At 310, the image editing system (e.g., the image generation subsystem) processes the edited latent space representation with a generator neural network to generate an output image. The generator neural network generates an image, which is similar to the original input image, (with the applied edits, if applicable) as output. Techniques for image generation with a generative model are described in detail in, e.g., Goodfellow et al., Generative Adversarial Nets, NIPS 2014, arXiv:1406.2661v1 (2014) and Karras et al. (2019) (StyleGAN, supra).

In some embodiments, the image editing system displays the output image to an editor interface (e.g., to the editor interface 104 shown in FIG. 1). For example, the image editing system transmits instructions for rendering the editor interface 104 to include the output image (e.g., from a server executing the image editing system to an external user device). Alternatively, or additionally, displaying the output image on the editor interface may include rendering the user interface on a display component of the image editing system itself, in embodiments where the image editing system executes on the user device.

By virtue of the specialized encoder architecture including a feed forward neural network with a bottleneck layer (in particular, a 256 node bottleneck layer), the output image can be generated faster than in prior systems. For example, the input image is processed by the feed forward encoder and the generator neural network to generate the output image in less than about ten milliseconds (ms). As a specific example, the output image can be generated in about nine ms.

In some embodiments, before providing the input image to the encoder neural network, the image editing system trains the encoder neural network. In some implementations, training the encoder neural network includes joint real and synthetic image supervision, as described with respect to FIG. 6. Alternatively, or additionally, training the encoder neural network includes a multi-stage approach, as described with respect to FIGS. 7 and 8. Alternatively, or additionally, training the encoder neural network includes minimizing a segmentation loss, as described with respect to FIG. 9. Alternatively, or additionally, training the encoder neural network includes minimizing a latent loss, as described with respect to FIG. 11.

Optionally, in some implementations, the projection subsystem further optimizes the latent space representation of the input image before editing and/or generating at 308 and 310. While transmitting the latent space representation of the input image directly to the generator can generate output very quickly (e.g., on the order of nine ms as noted above), the image may not resemble the input image to a desired degree for some applications. For example, as shown in the example results in FIG. 12, the output images are very realistic and resemble the input images at a high level. But, for this example of human face images, the output images do not always look like the same person (e.g., nose, eyes, texture, mouth and/or face shape are different). To generate an output image that is more similar (e.g., looks like the same person), an optimization step is performed. The optimization step includes minimizing a loss between the input image and the output image to generate an optimized latent space representation of the input image. The projection subsystem may compute suitable loss function that compares the input image to the output image, such as a pixel loss given by a sum of differences of pixel values between some or all pixels in the input image and corresponding pixels in the initial output image. An example of a suitable pixel loss function is:

$$\text{PixelLoss}(G(w), x) = \frac{1}{n}\sum_{i=1}^{n} |G(w)_i - x_i|^2,$$

where the pixels of the initial output image G(w) are given by $G(w)_i$ and the pixels of the input image x are given by $x_i$, and the square of the absolute value of the difference of each respective pixel is summed over the number of pixels of interest n (e.g., n total pixels in the images). Other suitable loss functions and optimization techniques are described in detail in the related patent application "Identity-Preserving Techniques for Generative Adversarial Network Projection."

Using the computed loss function, the projection subsystem minimizes the loss, to compute an optimized latent space representation of the input image. The projection subsystem may use a suitable optimizer to find the value of w to minimize the loss. For example, the projection subsystem computes:

$$\text{argmin } w = \text{PixelLoss}(G(w), x).$$

In some implementations, the projection subsystem applies the Limited-memory Broyden-Fletcher-Goldfarb-Shanno algorithm (L-BFGS) to minimize the loss function and identify the optimized w value. L-BFGS uses a limited amount of computer memory. Use of L-BFGS for the optimization can speed up the optimization process and limit the amount of computational resources required.

In some embodiments, the projection subsystem updates the latent space representation iteratively based on the minimized loss (e.g., to generate a first updated latent space representation, a second updated latent space representation, and so forth). This can be repeated until eventually the latent space representation is sufficiently optimized (e.g., optimization has converged), at which point the optimized latent space representation is processed with the generator neural network (e.g., as described above with respect to block 306) to generate an optimized output image.

Further advantages of this specialized encoder architecture with bottleneck layer include avoiding overfitting and enabling direct regression to the extended latent space of the GAN (e.g., $W_p$ space). With traditional encoder architectures, it is not feasible to directly produce a high-dimensional latent space representation (e.g., corresponding to $W_p$ space). One reason for this is the overfitting problem—a network trained to predict a high dimensional vector directly (e.g., 512 dimensions or 512×18 dimensions) will produce results that correspond too closely to the training data, and may therefore fail to fit additional data or predict future observations reliably. It has been found that, by using a bottleneck layer to represent the image first as a 256 length vector, the model is forced to generalize and the overfitting problem is overcome, allowing direct regression to high-dimensional space such as the $W_p$ space.

FIG. 4 illustrates a simplified example of an encoder architecture 400 according to some embodiments. The encoder includes a backbone 402, which is a machine learning model such as a feed forward neural network. The encoder further includes a 256 node bottleneck layer 404. The output of the backbone 402 and the bottleneck layer 404 is a 512×18 dimensional vector 406 in the $W_p$ space of the GAN.

In some aspects, the bottleneck layer 404 is used to directly regresses to $W_p$ space (e.g., rather than requiring additional manipulation to an output Z space vector, as is traditional). Use of the bottleneck layer helps to train the network faster, compared to prior systems. The bottleneck layer 404 also helps to avoid overfitting. The bottleneck architecture is also useful for generative search and has demonstrated to cover 95% of attribute search space.

Encoder Training

Several techniques for improved encoder training will now be described. These encoder training techniques are particularly advantageous when applied to the specialized encoder described above with respect to FIGS. 2-4, although these training techniques can be applied to various encoder architectures.

Joint Synthetic and Real Image Supervised Learning Techniques

Figure 5:
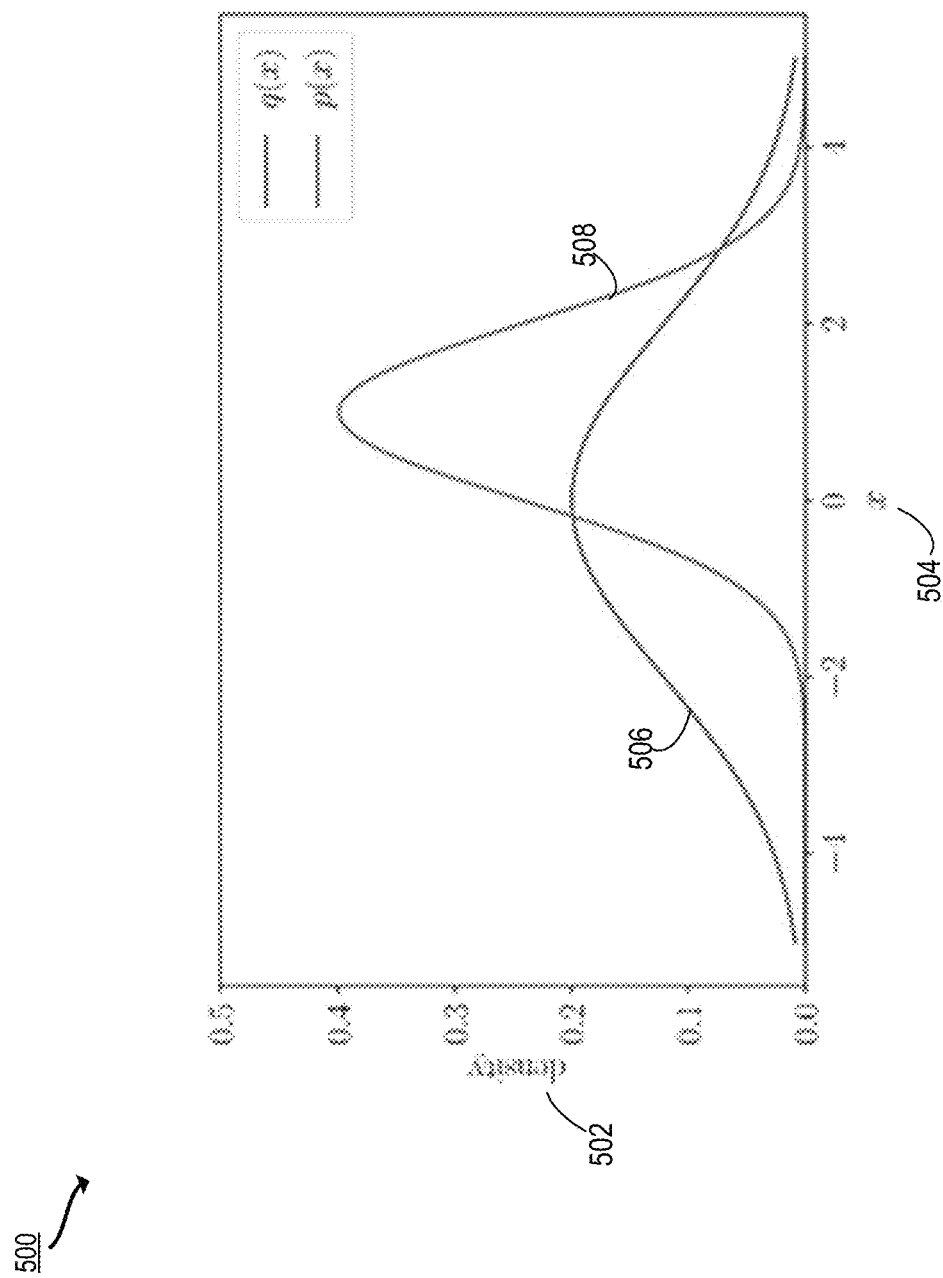
FIG. 5 depicts an example of a distribution of real and synthetic images according to certain embodiments of the present disclosure.

In some embodiments, joint synthetic and real image-based supervised learning techniques are used to train an encoder. Synthetic image supervision describes techniques for training a machine learning model (e.g., an encoder) using latent codes sampled from the latent space. These latent codes represent synthetic, or nonexistent computer generated, images. On the other hand, real image supervision describes techniques for using real images (e.g., digital images corresponding to actual photographs of a desired type, such as photographs of a human face, dog, cat, shoe, purse, etc.) for training a machine learning model such as an encoder. FIG. 5 illustrates a domain gap which is a motivation for the joint synthetic and real image techniques described with respect to FIG. 6.

FIG. 5 is a plot 500 showing a probability distribution (density 502) of real and synthetic images (x 504) in the latent space. If the encoder is only trained on purely synthetic images, then the encoder will not generate latent codes resulting in realistic images. Effectively, with a purely synthetic-image based supervised learning, the encoder is trained to recognize synthetic images, while the ultimate goal is often to produce a perfect copy of a photorealistic image. As shown in FIG. 5, the synthetic image distribution q(x) 506 is different from the real image distribution p(x) 508. In particular, only using synthetically sampled latent codes causes domain gap (e.g., Kullback-Leibler (KL) divergence), which is a shift in the relationship between data collected across different domains (e.g., computer generated images vs. images captured by real cameras). Models trained on data collected in one domain generally have poor accuracy on other domains. Thus, when an encoder trained purely on synthetic images is used to produce a latent space representation of an input image, and this latent space representation is provided to a generator to generate an image, the generated image may not appear photorealistic, due to the domain gap. Thus, training the encoder on only synthetic images can also lead to issues such as lack of accurate representation of population (e.g., the synthetic training data may be missing faces associated with certain ages, skin colors, or hair styles).

Training the encoder purely on real image also causes undesirable results. Unlike synthetic images, which are defined by a latent code, a real image has no perfect latent code training pair (rather, a corresponding latent code must be inferred). As a result, it has been found that only using real images for training causes blurry (e.g., fuzzy or unclear looking) output images. These issues motivate the joint real and synthetic image supervision techniques now described with respect to FIG. 6.

Figure 6:
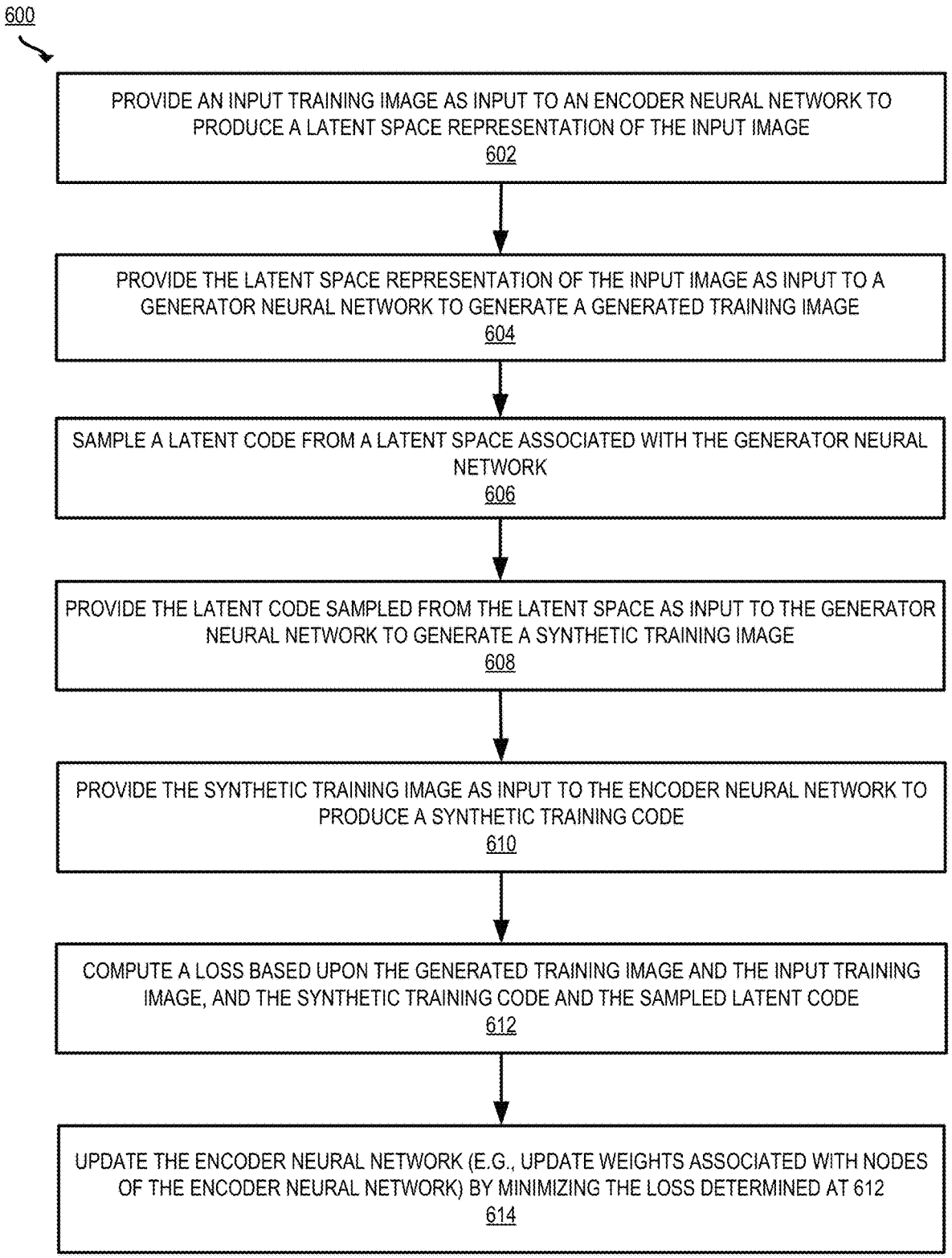
FIG. 6 depicts an example of a process for training an encoder using joint real and synthetic image supervision according to certain embodiments of the present disclosure.

FIG. 6 illustrates an example process 600 for training an encoder using joint real and synthetic image supervision, according to certain embodiments. The processing depicted in FIG. 6 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the processing may be performed in some different order or some steps may also be performed in parallel. In some implementations, one or more process blocks of FIG. 6 may be performed by an image editing system (e.g., the image editing system 102 of FIG. 1). In some implementations, one or more process blocks of FIG. 6 may be performed by another device or a group of devices separate from or including the image editing system 102 (e.g., the editor interface 104 executing on a user device).

In some embodiments, before the processing of FIG. 6, the image editing system (e.g., the training subsystem of the image editing system) obtains an input training image. For example, the image editing system retrieves the input training image from a local or remote database (e.g., from the training data 142 stored to the data storage unit 141).

At 602, the training subsystem provides the input training image as input to an encoder neural network to produce a latent space representation of the input training image. As described above with respect to blocks 302-304 of FIG. 3, the training subsystem provides the input training image as input to an encoder which has been trained to encode a latent space representation of the input image.

At 604, the training subsystem provides the latent space representation of the input training image as input to generator neural network to generate a generated training image. This may be performed as described above with respect to blocks 308-310 of FIG. 3, where the training subsystem provides the latent space representation of the input training image to a generator, which has been trained to generate an image based on the latent space representation.

At 606, the training subsystem samples a latent code from the latent space (e.g., a latent space associated with the generator neural network, such as Z, W, or $W_p$ space). In some implementations, the training subsystem randomly samples the latent code from the latent space. For example, the training subsystem randomly selects a point in the latent space.

In some embodiments, the training subsystem samples from a first latent space to obtain an initial latent code and augments the initial latent code to augmented latent space to generate the sampled latent code. For example, the training subsystem initially samples a point from Z space (one of several latent spaces of the GAN, as described above). The training subsystem then transforms the initial latent code to $W_p$ space (augmented latent space, another latent space of the GAN, as described above). For synthetic image supervision, it is desirable to sample from all points (e.g., taking a random value from the full distribution). But, given the distribution of points in the latent space, randomly sampling from a distribution will not necessarily correlate with the distribution of real life images (e.g., a random point may result in an image that does not look like a photorealistic human face, in the case of a human face dataset). The following techniques can be used to improve that sampling. It has been found that sampling in Z space results in generated images that accurately reflect the input image (e.g., realistic results are provided in that photorealistic images are generated based on an input photorealistic image). Sampling in Z space, however, does not offer high coverage for $W_P$ space, given the different dimensionality and distribution. Z space is relatively easy to sample, but not continuous. Sampling directly from $W_p$ space, on the other hand, can lead to unrealistic images (e.g., for an input photorealistic image, the resulting generated image is not photorealistic). Thus, this novel sampling technique of can generate realistic images and offer high coverage for $W_p$ space.

In some embodiments, the training subsystem samples the latent code by sampling in a neighborhood of the transformed initial latent code (e.g., $W_p$ space code) to generate the sampled latent code. In some implementations, the training subsystem randomly samples in the neighborhood of the transformed initial latent code. The properties of $W_p$ space assures realism in the immediate neighborhood (Penalized Likelihood (PL) regularization). For example, the training subsystem takes the transformed initial code, adds a small neighborhood, and searches in that neighborhood using domain knowledge. Sampling the neighborhood in $W_p$ will result in images similar to the images used to train the GAN (e.g., for a GAN trained on photorealistic images of human faces, the points in a given neighborhood will also correspond to photorealistic images of human faces, with smooth transitions in attributes). However, $W_p$ space is a large space, with many "holes." As a result, randomly sampling in $W_p$ space can provide results that do not look like the desired image (e.g., a photorealistic human face). To address these issues, the properties of $W_p$ space are used to inform the sampling process. If one point looks like real person a small multidimensional neighborhood will look like real person. This neighborhood is identified and used to sample, and the images from those sample points are more close to each other and realistic. As a specific example, the sampled latent code is given by:

$$w_{new} = w + \text{rand}(0.3),$$

where $w_{new}$ is the sampled latent code, w is the transformed initial latent code (e.g., the result of sampling in Z space and augmenting to $W_p$ space, and rand(0.3) is a random value between 0 and 0.3.

Alternatively or additionally, in some embodiments, the techniques of FIGS. 7 and/or 8 can be used to sample the latent code, as described below. For example, the encoder may initially be trained using the above-noted sampling technique, then fine-tuned using updated sampling as described below with respect to FIGS. 7 and 8.

At 608, the training subsystem provides the latent code sampled from the latent space as input to the generator neural network to generate a synthetic training image. This may be performed in a similar fashion as described above with respect to blocks 308-310 of FIG. 3, by providing the latent code sampled from the latent space to the generator 132 as input, where the generator outputs the synthetic training image.

At 610, the training subsystem provides the synthetic training image as input to the encoder neural network to encode a synthetic training code. This may be performed in a similar fashion as describe above with respect to blocks 302-304 of FIG. 3, by providing the synthetic training image as input to the encoder 112 as input, where the encoder outputs the synthetic training code.

At 612, the training subsystem computes a loss based upon the generated training image and the input training image, and the synthetic training code and the sampled latent code. In other words, the loss includes a synthetic loss component (a function of the synthetic training code and the sampled latent code) and a real loss component (a function of the generated training image and the input training image). As a specific example, the loss function is:

$$\text{Loss} = w_1 * \|G(E(x)) - x\| + w_2 * \|E(G(w)) - w\|.$$

This loss function includes a real loss component, $$\|G(E(x)) - x\|,$$

the normalized vector difference of the generated training image generated at 604 and the input training image.

The loss function further includes a synthetic loss component, $$\|E(G(w)) - w\|,$$

the normalized vector difference between the synthetic training code produced at 608 and the latent code sampled from the latent space at 606.

In some implementations, the loss between the generated training image and the input training image is weighted by a first value (e.g., $w_1$ as shown above), and the loss between the synthetic training code and the sampled latent code is weighted by a second value different from the first value (e.g., $w_2$ as shown above).

At 614, the training subsystem updates the encoder neural network by minimizing the loss determined at 612. For example, the encoder neural network includes a plurality of nodes, and weights associated with the nodes are updated according to the minimized loss. In some implementations, the training subsystem uses backpropagation to trace the loss back from the output layer through the intermediate layers of the encoder to the input layer. The values of the weights associated with the connections between the nodes in the neural network are thereby updated. The error is backpropagated through the layers by adjusting the weights associated with connections of nodes at each layer. This process is repeated until the output error is below a predetermined threshold. In some embodiments, as described below with respect to FIGS. 7 and 8, the encoder is trained using a multistage approach. First, the encoder is trained using steps 602-614. Then, the encoder is retrained or fine-tuned using the processes of FIGS. 7 and/or 8, as described below.

One or more operations in blocks 604-614 implement a step for training an encoder by minimizing a loss as a function of both the input training image and a synthetic training code generated by the encoder. For example, the training subsystem produces a latent space representation of the input training image at 602 and generates a generated training image from the latent space representation at 604. The training subsystem samples a latent code from the latent space at 606 and generates a synthetic training image by applying a generator neural network to the latent code sampled from the latent space at 608. The training subsystem produces a synthetic training code at 610, computes a loss based on the generated training image and the input training image, and the synthetic training code and the sampled latent code, at 612, and updates the encoder by minimizing the loss at 614.

Multi-Stage Encoder Training Approach

Figure 7:
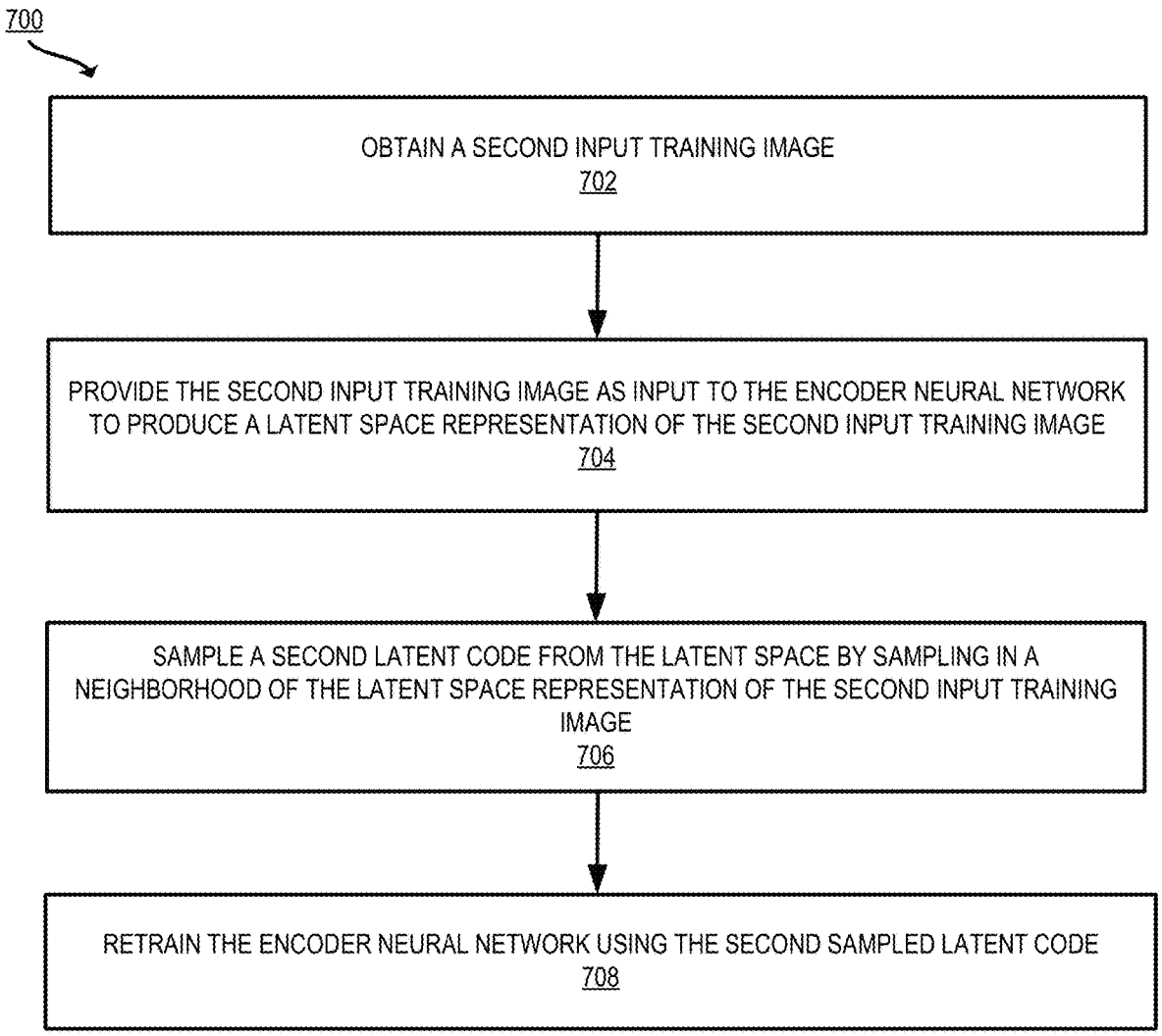
FIG. 7 depicts an example of a process for multi-stage encoder training according to certain embodiments of the present disclosure.

FIGS. 7 and 8 provide techniques for training an encoder (e.g., starting with the techniques of FIG. 6) using a multi-stage approach in which the encoder is trained, then latent space code is resampled using the trained encoder, which is used for subsequent iterations of fine-tuning the encoder. The techniques of FIGS. 7 and 8 can be used together or separately to further refine the encoder training process.

FIG. 7 is a flowchart of an example process 700 for resampling latent codes for fine-tuning an encoder according to some embodiments. The processing depicted in FIG. 7 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the processing may be performed in some different order or some steps may also be performed in parallel. In some implementations, one or more process blocks of FIG. 7 may be performed by an image editing system (e.g., the image editing system 102 of FIG. 1). In some implementations, one or more process blocks of FIG. 7 may be performed by another device or a group of devices separate from or including the image editing system 102 (e.g., the editor interface 104 executing on a user device).

At 702, the training subsystem obtains a second input training image. For example, the image editing system retrieves the second input training image from a local or remote database (e.g., from the training data 142 stored to the data storage unit 141). In some implementations, the second input training image is a real image (e.g., a digital photograph).

At 704, the training subsystem provides the second input training image as input to the encoder neural network to produce a latent space representation of the second input training image. As described above with respect to blocks 302-304 of FIG. 3, the training subsystem provides the input training image as input to an encoder which has been trained to encode a latent space representation of the input image.

At 706, the training subsystem samples a second latent code from the latent space by sampling in a neighborhood of the latent space representation of the second input training image. For example, the second sampled latent code is given by—

$$w'=E'(x)+\text{rand}(0.3),$$

where w' is a latent code sampled based upon the trained encoder, E' is the trained encoder, x is the second input training image, E'(x) is a latent space representation of the second input training image x, and rand(0.3) is a random number between 0 and 0.3. Using w' to generate an image (e.g., as opposed to the sampling techniques described with respect to block 606 of FIG. 6) will generate a result that looks more photorealistic (e.g., having less signatures of a computer-generated image). This results a new synthetic image pair (x, w') which is closer to a realistic distribution.

At 708, the training subsystem retrains the encoder neural network using the second sampled latent code. The training process may be performed in a similar fashion as described above with respect to the process 600 of FIG. 6. For example, the training subsystem provides the latent space representation of the second input training image (e.g., as produced at 704) as input to the generator neural network to generate a second generated training image. The training subsystem provides the second sampled latent code as input to the generator neural network to generate a synthetic training image (e.g., the synthetic training image generated at 608 is a first synthetic training image, and the synthetic training image generated at 708 is a second synthetic training image). The training subsystem provides the synthetic training image as input to the encoder neural network to produce a synthetic training code (e.g., the synthetic training code produces at 610 is a first synthetic training code, and the synthetic training code produced at 710 is a second synthetic training code). The training subsystem updates the encoder neural network by minimizing a loss between the second generated training image and the second input training image, and the second synthetic training code and the second sampled latent code.

In some implementations, the training subsystem then performs another stage of encoder training, as described with respect to FIG. 8.

FIG. 8 is a flowchart of an example process 800 for multi-stage encoder training (e.g., to perform subsequently to the processing of FIGS. 6 and 7) according to certain embodiments. The processing depicted in FIG. 8 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the processing may be performed in some different order or some steps may also be performed in parallel. In some implementations, one or more process blocks of FIG. 8 may be performed by an image editing system (e.g., the image editing system 102 of FIG. 1). In some implementations, one or more process blocks of FIG. 8 may be performed by another device or a group of devices separate from or including the image editing system 102 (e.g., the editor interface 104 executing on a user device).

In some embodiments, before 802, the training subsystem obtains a third input training image. For example, the image editing system retrieves the third input training image from a local or remote database (e.g., from the training data 142 stored to the data storage unit 141). In some implementations, the second input training image is a real image (e.g., a digital photograph).

In some embodiments, at 802, the training subsystem provides a third input training image as input to the encoder neural network to produce a latent space representation of the third input training image. As described above with respect to blocks 302-304 of FIG. 3, the training subsystem provides the input training image as input to an encoder neural network which has been trained to encode a latent space representation of the input image.

At 804, the training subsystem generates a third generated training image by providing the latent space representation of the third input training image as input to the generator neural network. As described above with respect to blocks 308 and 310 of FIG. 3, the generator neural network can take a latent space representation as input and generate a corresponding image as output.

At 806, the training subsystem minimizes a loss between the third input training image and the third generated training image to optimize the latent space representation of the third input training image. To optimize the latent space representation, the image editing system performs an optimization process. For example, the optimization process includes minimizing a loss as a function of a generated image and an input training image. For example, the image editing system minimizes a loss between the third generated training image generated at 804 and the third input training image. The loss can be minimized using an optimization algorithm such as Limited-memory Broyden-Fletcher-Goldfarb-Shanno algorithm (L-BFGS). Suitable loss functions and techniques for optimization are described in further detail in the related application "Identity Preserving Techniques for Generative Adversarial Network Projection." The optimized latent space representation more accurately reflects the input image by way of the optimization process.

At 808, the training subsystem samples a third latent code from the latent space by sampling in a neighborhood of the optimized latent space representation of the third input training image. For example, a third latent code w'" is computed using $$w''' = \text{projection\_pipeline}(x) + \text{rand}(0.3),$$

where projection_pipeline(x) is the optimized latent space representation of the third input training image and rand(0.3) is a random number between 0 and 0.3. This resampling provides better sampling of $W_P$ space by using the optimized latent space representation and the pre-trained encoder as a starting point.

At 810, the training subsystem retrains the encoder neural network using the third sampled latent code. The training process may be performed in a similar fashion as described above with respect to the process 600 of FIG. 6. For example, the training subsystem provides the third sampled latent code sampled at 808 as input to the generator neural network to generate a synthetic training image (e.g., a third synthetic training image). The training subsystem provides the synthetic training image as input to the encoder neural network to produce a synthetic training code (e.g., a third synthetic training code). The training subsystem updates the encoder neural network by minimizing a loss between the third generated training image and the third input training image, and the third synthetic training code and the third sampled latent code.

In some implementations, the processes 600, 700, 800 are performed sequentially. First, the encoder neural network is trained using the process 600. Then, training images are projected using the encoder, and used to better sample the latent space. The encoder is further fine-tuned with the newly-sampled data using the process 700. Then, a training image is encoded and optimized to generate an even more realistic training pair for a next stage of encoder training using the process 800. In some implementations, the process 700 is then repeated until convergence. In this way the encoder is used to improve the sampling, then include that in the encoder training again, and repeated. Using this multi-stage approach provides realistic and high-resolution results (e.g., as shown in the example output images of FIG. 12).

Segmentation Loss

FIG. 9 is a flowchart of an example process 900 for encoder training using segmentation loss, according to certain embodiments. The processing depicted in FIG. 9 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the processing may be performed in some different order or some steps may also be performed in parallel. In some implementations, one or more process blocks of FIG. 9 may be performed by an image editing system (e.g., the image editing system 102 of FIG. 1). In some implementations, one or more process blocks of FIG. 9 may be performed by another device or a group of devices separate from or including the image editing system 102 (e.g., the editor interface 104 executing on a user device).

In some embodiments, before the processing of the process 900, the image editing system (e.g., the training subsystem of the image editing system) obtains an input training image. For example, the image editing system may retrieve an input training image from a local or remote database (e.g., from the training data 142 stored to the data storage unit 141).

Figure 10:
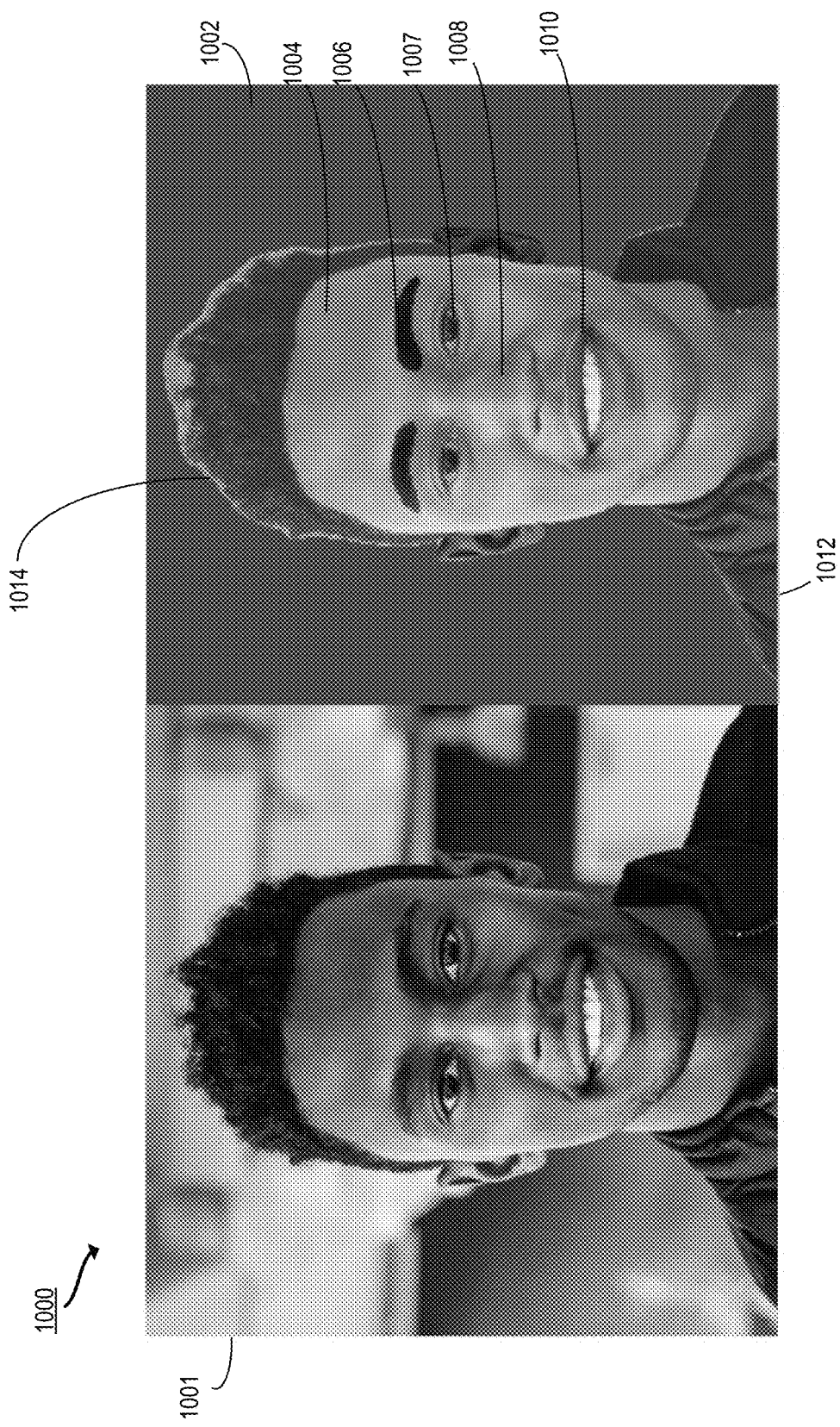
FIG. 10 depicts examples of images illustrating image segmentation according to certain embodiments of the present disclosure.

At 902, the training subsystem provides an input training image to a segmentation neural network to generate a segmented training image. The training subsystem provides the input training image to the segmentation neural network as input. The segmentation neural network is a neural network configured to identify, or segment, different parts of an image. For example, as illustrated in FIG. 10, given an input image 1001 including a face, the segmentation neural network color codes or otherwise labels different portions of the face such as eyebrows 1006, nose 1008, lips 1010, and so forth. Suitable segmentation neural networks and techniques for image segmentation are described in, e.g., Minaee et. al., "Image Segmentation Using Deep Learning: A Survey," *IEEE Transactions on Pattern Analysis and Machine Intelligence*, doi: 10.1109/TPAMI.2021.3059968 (2020).

Logits from the last layer of the segmentation network may be obtained to determine the segmented training image. The output of the segmentation neural network is a segmented image that identifies different segments of the input image (e.g., a face part mask).

At 904, the training subsystem provides the input training image to the encoder neural network to produce a latent space representation of the input training image. As described above with respect to blocks 302 and 304 of FIG. 3, an image can be provided as input to the encoder neural network, and the encoder neural network produces a latent space representation of that image, which is a N-dimensional vector representation of the input image.

At 906, the training subsystem provides the latent space representation of the input training image as input to the generator neural network to generate a generated training image. As described above with respect to blocks 305 and 308 of FIG. 3, the generator neural network can take a latent space representation as input and generate a corresponding image as output.

At 908, the training subsystem applies provides the generated training image as input to the segmentation neural network to generate a segmented generated training image. This can be performed in a similar fashion as described above with respect to 902.

At 910, the training subsystem computes a loss based upon the segmented generated training image and the segmented input training image. For example, the loss can be computed using Segmentation loss=$|S(G(w))-S(x)|$, where w is the latent space representation of the input training image produced at 904, G(w) is the generated training image generated at 906, x is the input training image, S(G(w)) is the segmented generated training image generated at 908, and S(x) is the segmented input image generated at 902. Accordingly, in some implementations, the segmentation loss is a normalized difference between the segmented generated training image and the segmented input training image.

At 912, the training subsystem updates the encoder neural network by minimizing the loss determined at 910. The encoder neural network may be updated by updating weights associated with nodes of the encoder neural network. For example, the training subsystem applies backpropagation to update the encoder neural network based on the segmentation loss, as described above with respect to block 614 of FIG. 6.

Using segmentation loss for encoder training provides efficient supervision for learning consistency. For example, for images of faces, face segmentation loss is used to enforce face part consistency. This helps to reduce face part alignment issues—a key problem in postprocessing (e.g., as performed by the postprocessor 134 of FIG. 1). As further described in the related applications "Techniques for Improved Resolution and Accuracy in GAN-Based Image Editing" and "Techniques for Smooth Region Merging in GAN-Based Image Editing," if part of an image is cropped, encoded, and used to generate a new (e.g., edited) image, often the cropped region does not properly align. For example a generated image of a cropped face will not properly align with the neck. Segmentation loss helps mitigate these alignment issues. As another example, if a generated image is to be edited or otherwise combined with the original image, an image generated using segmentation loss would allow images to exactly align on eye corners other parts. Thus, segmentation loss helps the post-processing process be performed more accurately and efficiently.

FIG. 10 is an example of an input image 1001 and corresponding segmented image 1002, e.g., as produced in the process 900 of FIG. 9. The input image 1001 is provided as input to a segmentation neural network, and the segmentation neural network produces the segmented image 1002 as output. The segmented image 1002 includes multiple segments corresponding to different regions of the image.

In this example, the input image 1001 includes a face, and the segments in the segmented image 1002 correspond to different portions of the face. The segments are indicated in different colors, and include cheeks, chin, and forehead 1004, eyebrows 1006, eyes 1007, nose 1008, lips 1010, ears 1012, and hair 1014. The segmented image 1002 can be used in encoder training to enforce face part consistency, as described above with respect to FIG. 9.

Figure 11:
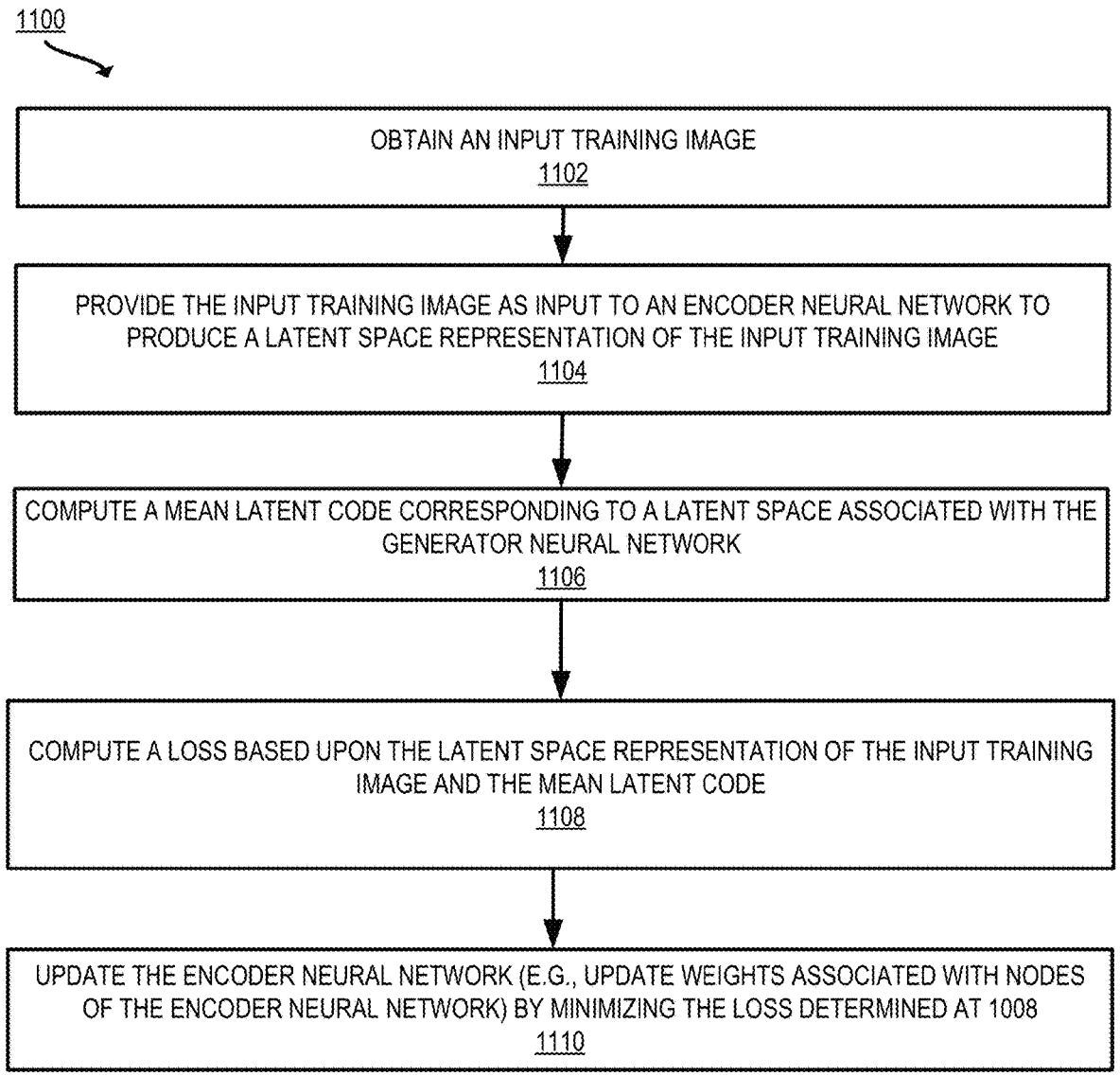
FIG. 11 depicts a flowchart of an example process for training an encoder using latent loss according to certain embodiments of the present disclosure.

FIG. 11 is a flowchart of an example process 1100 for encoder training using mean latent loss, according to certain embodiments. The processing depicted in FIG. 11 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 11 and described below is intended to be illustrative and non-limiting. Although FIG. 11 depicts the various processing steps occurring in a particular sequence or order, this is not intended to be limiting. In certain alternative embodiments, the processing may be performed in some different order or some steps may also be performed in parallel. In some implementations, one or more process blocks of FIG. 11 may be performed by an image editing system (e.g., the image editing system 102 of FIG. 1). In some implementations, one or more process blocks of FIG. 11 may be performed by another device or a group of devices separate from or including the image editing system 102 (e.g., the editor interface 104 executing on a user device).

In some embodiments, at 1102, the image editing system (e.g., the training subsystem of the image editing system) obtains an input training image. For example, the image editing system may retrieve an input training image from a local or remote database (e.g., from the training data 142 stored to the data storage unit 141).

At 1104, the training subsystem provides the input training image as input to an encoder neural network (e.g., the specialized encoder described above with respect to FIGS. 2-4, or another suitable encoder). Based on the input training image, the encoder neural network produces a latent space representation of the input training image. As described above with respect to blocks 302 and 304 of FIG. 3, an image can be provided as input to the encoder neural network, and the encoder neural network produces a latent space representation of that image, which is a N-dimensional vector representation of the input image.

At 1106, the training subsystem computes a mean latent code corresponding to a latent space associated with the generator neural network. The latent space is, e.g., the $W_p$ space, W space, or Z space of the GAN, as described above. The mean latent code corresponds to the mean value of latent vectors in the latent space. In some embodiments, the training subsystem computes the latent code by computing the statistical mean of the distribution in the latent space. The mean latent code is a latent code that corresponds to an average image within the image space of the GAN. For example, for a face image-orientated latent space, the average latent code, when input to a generator, will result in an average face (e.g., from the multitude of possible faces, this one has an average age, skin color, hair style, etc.). Generally such an image will correspond to a face that appears middle aged, with a neutral expression.

At 1108, the training subsystem computes a loss based upon the latent space representation of the input training image and the mean latent code. For example, a mean latent loss can be computed using:

$$\text{Mean Latent Loss}=|E(x)-w_{mean}|,$$

where $E(x)$ is the latent space representation of the input training image produced at 1104 and $w_{mean}$ is the mean latent code computed at 1106. The mean latent loss may be a component in an overall loss function, including one or more of the loss components described above with respect to FIGS. 6-9, or stand-alone.

At 1110, the training subsystem updates the encoder neural network (e.g., updates weights associated with nodes of the encoder neural network) by minimizing a loss between the latent space representation of the input training image and the mean latent code (e.g., the loss determined at 1108). For example, the training subsystem trains the encoder using backpropagation, as described above with respect to block 614 of FIG. 6.

Training the encoder neural network using a mean latent loss helps the encoder output to be close to the mean latent code. Given a target, the ultimate generated image can be kept from being very far from an average image corresponding to the mean latent code. The mean latent loss can be applied to the encoder training process to regularize when the encoder predicts images that it is not far from the mean. This will result in an image that is constrained towards the average image in the training data set. Further deviation from mean can cause implausible images (e.g., an image generated from a latent space representation of an input image produced with the encoder can obtain unusual features that were not present in the input image). The mean latent loss described above penalizes such implausible results, leading to generated images that are more accurate and realistic.

Figure 12:
FIG. 12 depicts examples of images generated using a latent code produced using certain techniques of the present disclosure.

FIG. 12 illustrates example images 1200 showing encoder input and output. These images are generated using an encoder-generator pipeline (e.g., without an optimization step). In FIG. 12, the top row shows an original input image (1202, 1206, 1210, 1214, 1218, 1222, and 1226). The lower row shows the corresponding output images (1204, 1208, 1212, 1216, 1220, 1224, and 1228).

Although the output images do not look exactly the same (e.g., with fewer wrinkles or slightly different features in the output image compared to the input image), the photos can be encoded and generated (and potentially edited) much faster than if using a pipeline including an optimization step. For example, the images of FIG. 12 can be generated on the order of milliseconds (e.g., about 9 milliseconds (ms)), compared to generating an image in seconds or minutes using optimization.

Thus, the encoder can be used for quick editing applications, such as a fast photo cleaning application. For example, an input image can be input the encoder neural network to generate a latent space representation which is then input to the generator neural network to generate an output image, as described herein. This can be used to remove objects or features quickly, if speed is preferable to exact replication. Objects, tattoos, shadows, and so forth can be removed by encoding the input images using the encoder techniques described herein. For example, features such as face paint, objects blocking the face, or dark shadows can be removed by encoding an image using the encoder neural network and generating an output image using the generator neural network. These sort of photo-cleaning operations can be applied without any additional edits to the latent space representation by virtue of the simplified representation produced by the encoder.

Example of a Computing System for GAN Based Image Processing

Figure 13:
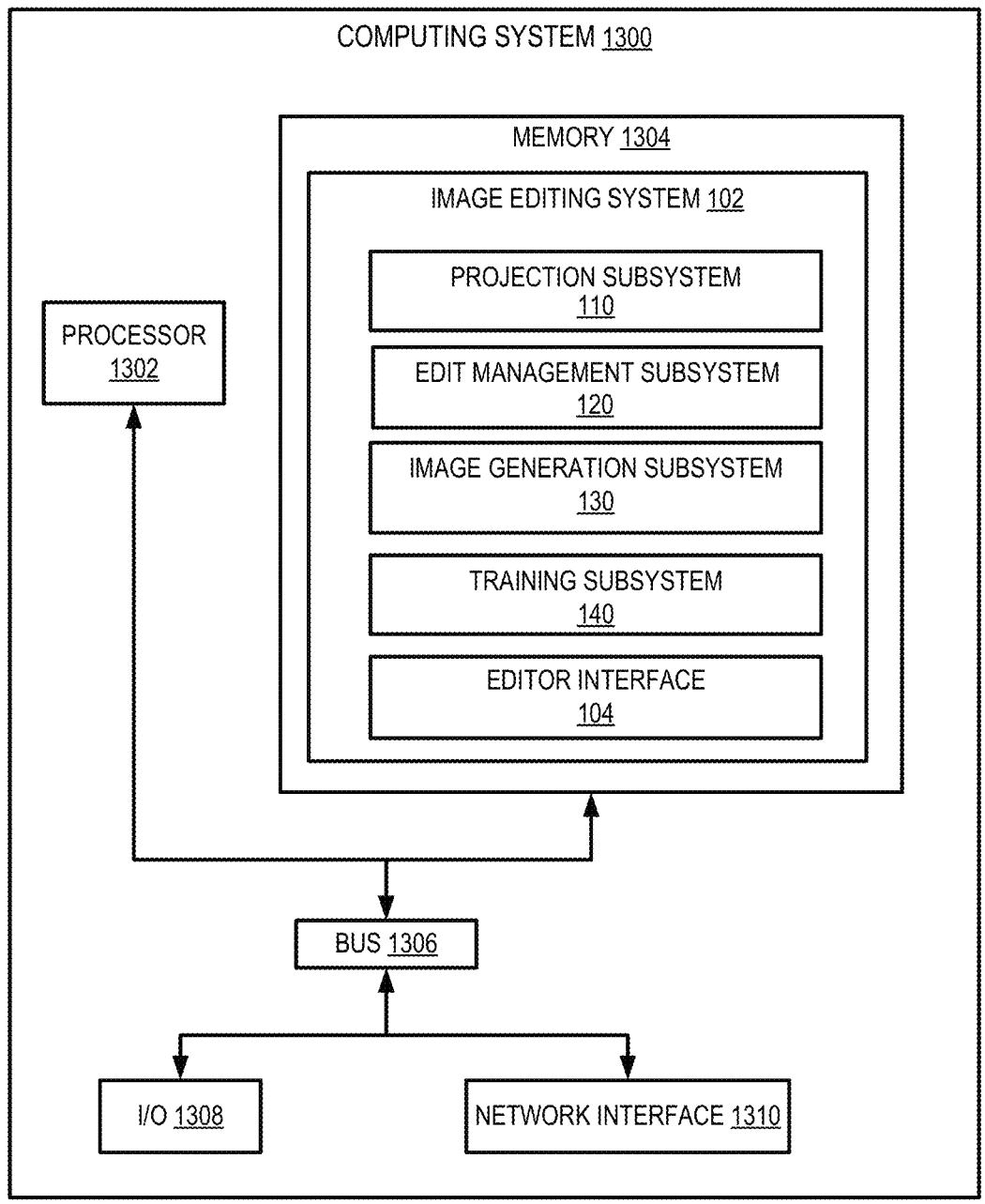
FIG. 13 depicts an example of a computing system that performs certain operations described herein according to certain embodiments of the present disclosure.

Any suitable computing system or group of computing systems can be used for performing the operations described herein. For example, FIG. 13 depicts examples of computing system 1300 that executes an edit management subsystem 120 for performing image processing as described herein. In some embodiments, the computing system 1300 also executes a projection subsystem 110 for performing latent space projection as described herein, an image generation subsystem 130 for performing image generation as described herein, a training subsystem 140 for performing machine learning model training as described herein, and an editor interface 104 for controlling input and output to configure image edits as described herein. In other embodiments, a separate computing system having devices similar to those depicted in FIG. 13 (e.g., a processor, a memory, etc.) executes one or more of the subsystems 110-140 and the editor interface 104.

The depicted examples of a computing system 1300 includes a processor 1302 communicatively coupled to one or more memory devices 1304. The processor 1302 executes computer-executable program code stored in a memory device 1304, accesses information stored in the memory device 1304, or both. Examples of the processor 1302 include a microprocessor, an application-specific integrated circuit ("ASIC"), a field-programmable gate array ("FPGA"), or any other suitable processing device. The processor 1302 can include any number of processing devices, including a single processing device.

The memory device 1304 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1300 may also include a number of external or internal devices, such as input or output devices. For example, the computing system 1300 is shown with one or more input/output ("I/O") interfaces 1308. An I/O interface 1308 can receive input from input devices or provide output to output devices. One or more buses 1306 are also included in the computing system 1300. The bus 1306 communicatively couples one or more components of a respective one of the computing system 1300.

The computing system 1300 executes program code that configures the processor 1302 to perform one or more of the operations described herein. The program code includes, for example, the projection subsystem 110, the edit management subsystem 120, the image generation subsystem 130, the training subsystem 140, the editor interface 104, or other suitable applications that perform one or more operations described herein. The program code may be resident in the memory device 1304 or any suitable computer-readable medium and may be executed by the processor 1302 or any other suitable processor. In some embodiments, the projection subsystem 110, the edit management subsystem 120, the image generation subsystem 130, the training subsystem 140, and the editor interface 104 are stored in the memory device 1304, as depicted in FIG. 13. In additional or alternative embodiments, one or more of the image the projection subsystem 110, the edit management subsystem 120, the image generation subsystem 130, the training subsystem 140, and the editor interface 104 are stored in different memory devices of different computing systems. In additional or alternative embodiments, the program code described above is stored in one or more other memory devices accessible via a data network.

The computing system 1300 can access data in any suitable manner. In some embodiments, some or all of one or more of these data sets, models, and functions are stored in the memory device 1304, as in the example depicted in FIG. 13. For example, a computing system 1300 that executes the training subsystem 140 can access training data stored by an external system.

In additional or alternative embodiments, one or more of these data sets, models, and functions are stored in the same memory device (e.g., one of the memory devices 1304). For example, a common computing system can host the edit management subsystem 120 and the training subsystem 140 as well as the training data. In additional or alternative embodiments, one or more of the programs, data sets, models, and functions described herein are stored in one or more other memory devices accessible via a data network.

The computing system 1300 also includes a network interface device 1310. The network interface device 1310 includes any device or group of devices suitable for establishing a wired or wireless data connection to one or more data networks. Non-limiting examples of the network interface device 1310 include an Ethernet network adapter, a modem, and the like. The computing system 1300 is able to communicate with one or more other computing devices (e.g., a computing device executing the editor interface 104 as depicted in FIG. 1) via a data network using the network interface device 1310.

Figure 14:
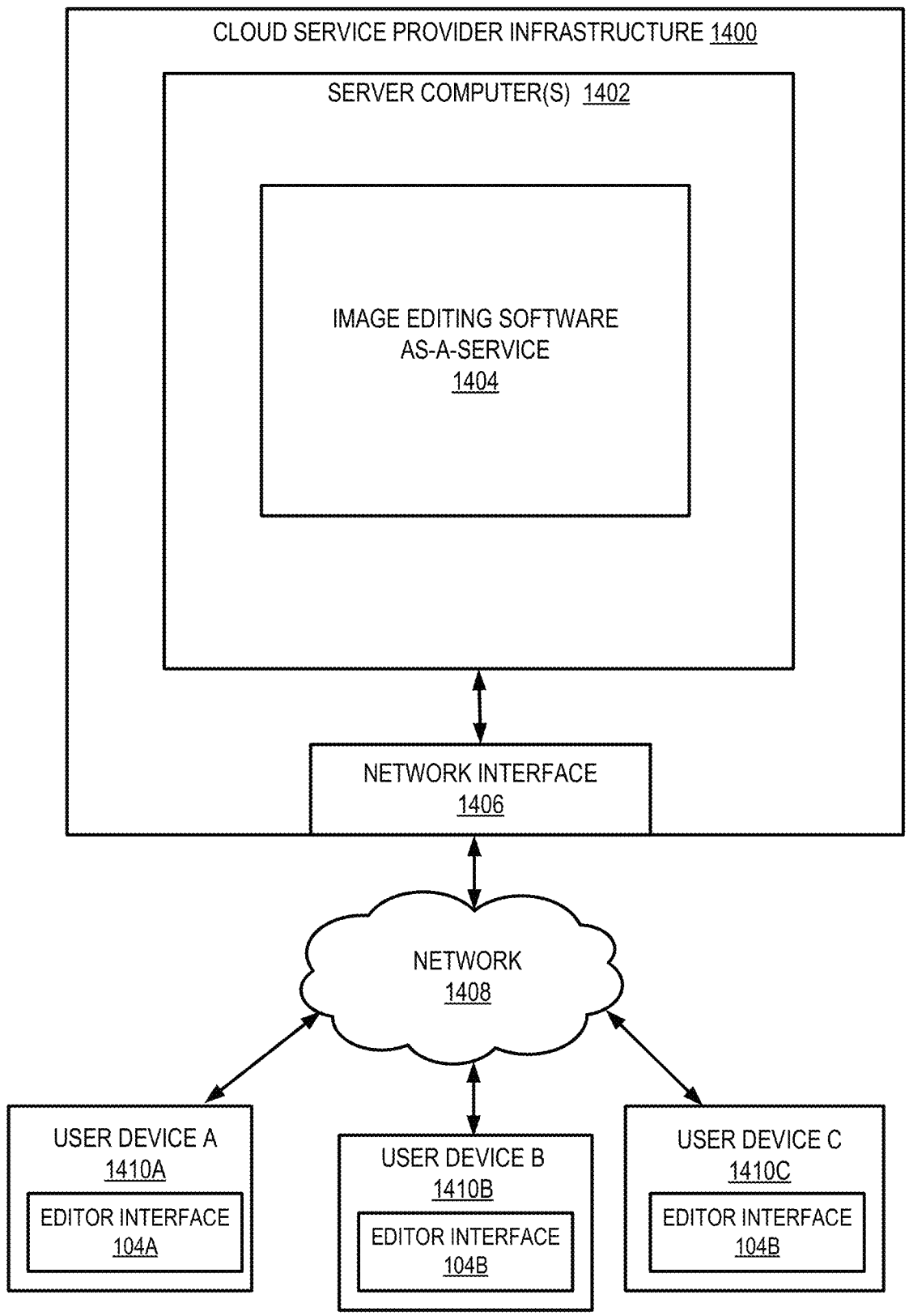
FIG. 14 depicts an example of a cloud computing environment that performs certain operations described herein according to certain embodiments of the present disclosure.

In some embodiments, the functionality provided by the computing system 1300 may be offered via a cloud-based service provided by a cloud infrastructure 1400 provided by a cloud service provider. For example, FIG. 14 depicts an example of a cloud infrastructure 1400 offering one or more services including a service that offers image editing functionality as described in this disclosure. Such a service can be subscribed to and used by a number of user subscribers using user devices 1410A, 1410B, and 1410C across a network 1408. The service may be offered under a Software as a Service (SaaS) model. One or more users may subscribe to such as service.

In the embodiment depicted in FIG. 14, the cloud infrastructure 1400 includes one or more server computer(s) 1402 that are configured to perform processing for providing one or more services offered by the cloud service provider. One or more of server computer(s) 1402 may implement a projection subsystem 110, edit management subsystem 120, image generation subsystem 130, and training subsystem 140, as depicted in FIG. 13. The subsystems 110-140 may be implemented using software only (e.g., code, program, or instructions executable by one or more processors provided by cloud infrastructure 1400), in hardware, or combinations thereof. For example, one or more of the server computer(s) 1402 may execute software to implement the services and functionalities provided by subsystems 110-140, where the software, when executed by one or more processors of the server computer(s) 1402, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1402 can include volatile memory, non-volatile memory, or a combination thereof.

In the embodiment depicted in FIG. 14, cloud infrastructure 1400 also includes a network interface device 1406 that enables communications to and from cloud infrastructure 1400. In certain embodiments, the network interface device 1406 includes any device or group of devices suitable for establishing a wired or wireless data connection to the network 1408. Non-limiting examples of the network interface device 1406 include an Ethernet network adapter, a modem, and/or the like. The cloud infrastructure 1400 is able to communicate with the user devices 1410A, 1410B, and 1410C via the network 1408 using the network interface device 1406.

An editor interface (e.g., editor interface 104A, editor interface 104B, and editor interface 104C) may be displayed on each of the user devices user device A 1410A, user device B 1410B, and user device C 1410C. A user of user device 1410A may interact with the displayed editor interface, for example, to enter an input image and/or image edit parameters. In response, processing for image processing may be performed by the server computer(s) 1402.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method for training an encoder neural network comprising:
    providing an input training image as input to the encoder neural network, the encoder neural network implemented by one or more computing systems;
    producing, by the encoder neural network, a latent space representation of the input training image;
    providing the latent space representation of the input training image produced by the encoder neural network as input to a generator neural network, the generator neural network implemented using the one or more computing systems;
    generating, by the generator neural network, a generated training image based upon the latent space representation of the input training image;
    sampling a latent code from a latent space associated with the generator neural network, wherein sampling the latent code from the latent space comprises:
    sampling from a first latent space to obtain an initial latent code, and
    transforming the initial latent code to an augmented latent space to generate the sampled latent code;
    providing the sampled latent code as input to the generator neural network;
    generating, by the generator neural network, a synthetic training image based on the sampled latent code;
    providing the sampled latent code as input to the encoder neural network;
    producing, by the encoder neural network, a synthetic training code based upon the sampled latent code;
    updating the encoder neural network by minimizing a loss between the generated training image and the input training image, and the synthetic training code and the sampled latent code to produce a trained encoder neural network; and
    providing the trained encoder neural network and the generator neural network for generating an output image for display.

2. The method of claim 1, wherein the loss between the generated training image and the input training image is weighted by a first value, and the loss between the synthetic training code and the sampled latent code is weighted by a second value different from the first value.

3. The method of claim 1, further comprising sampling in a neighborhood of the transformed initial latent code to generate the sampled latent code.

4. The method of claim 1, further comprising:
    providing a second input training image as input to the encoder neural network to produce a latent space representation of the second input training image;
    sampling a second latent code from the latent space by sampling in a neighborhood of the latent space representation of the second input training image; and
    retraining the encoder neural network using the second sampled latent code.

5. The method of claim 4, further comprising:
    providing a third input training image as input to the encoder neural network to produce a latent space representation of the third input training image;
    generating a third generated training image by providing the latent space representation of the third input training image as input to the generator neural network;
    minimizing a loss between the latent space representation of the third input training image and the third generated training image to optimize the latent space representation of the third input training image;
    sampling a third latent code from the latent space by sampling in a neighborhood of the optimized latent space representation of the third input training image; and
    retraining the encoder neural network using the third sampled latent code.

6. The method of claim 5, wherein retraining the encoder neural network using the third sampled latent code comprises:
    providing the third sampled latent code as input to the generator neural network to generate a third synthetic training image;
    providing the third synthetic training image as input to the encoder neural network to produce a third synthetic training code; and
    updating the encoder neural network by minimizing a loss between the third generated training image and the third input training image, and the third synthetic training code and the third sampled latent code.

7. A computing system comprising:
    a processor;
    a non-transitory computer-readable medium comprising instructions which, when executed by the processor, perform processing comprising:
    providing an input training image as input to an encoder neural network, the encoder neural network implemented by one or more computing systems;
    producing, by the encoder neural network, a latent space representation of the input training image;

providing the latent space representation of the input training image produced by the encoder neural network as input to a generator neural network, the generator neural network implemented using the one or more computing systems;

generating, by the generator neural network, a generated training image based upon the latent space representation of the input training image;

generating a sampled latent code by:
sampling from a first latent space to obtain an initial latent code, and
transforming the initial latent code to an augmented latent space to generate the sampled latent code;

providing the sampled latent code as input to the generator neural network;

generating, by the generator neural network, a synthetic training image based on the sampled latent code;

providing the sampled latent code as input to the encoder neural network;

producing, by the encoder neural network, a synthetic training code based upon the sampled latent code; and updating the encoder neural network by minimizing a loss between the generated training image and the input training image, and the synthetic training code and the sampled latent code to produce a trained encoder neural network; and providing the trained encoder neural network and the generator neural network for generating an output image for display.

8. The computing system of claim 7, wherein the loss between the generated training image and the input training image is weighted by a first value, and the loss between the synthetic training code and the sampled latent code is weighted by a second value different from the first value.

9. The computing system of claim 7, the processing further comprising sampling in a neighborhood of the transformed initial latent code to generate the sampled latent code.

10. The computing system of claim 7, the processing further comprising:
providing a second input training image as input to the encoder neural network to produce a latent space representation of the second input training image;
sampling a second latent code from the latent space by sampling in a neighborhood of the latent space representation of the second input training image; and
retraining the encoder neural network using the second sampled latent code.

11. The computing system of claim 10, the processing further comprising:
providing a third input training image as input to the encoder neural network to produce a latent space representation of the third input training image;
generating a third generated training image by providing the latent space representation of the third input training image as input to the generator neural network;
minimizing a loss between the latent space representation of the third input training image and the third generated training image to optimize the latent space representation of the third input training image;
sampling a third latent code from the latent space by sampling in a neighborhood of the optimized latent space representation of the third input training image; and
retraining the encoder neural network using the third sampled latent code.

12. The computing system of claim 11, wherein retraining the encoder neural network using the third sampled latent code comprises:
providing the third sampled latent code as input to the generator neural network to generate a third synthetic training image;
providing the third synthetic training image as input to the encoder neural network to produce a third synthetic training code; and
updating the encoder neural network by minimizing a loss between the third generated training image and the third input training image, and the third synthetic training code and the third sampled latent code.

13. A non-transitory computer-readable medium having instructions stored thereon, the instructions executable by a processing device to perform operations comprising:
providing an input training image as input to an encoder neural network, the encoder neural network implemented by one or more computing systems;
producing, by the encoder neural network, a latent space representation of the input training image;
providing the latent space representation of the input training image produced by the encoder neural network as input to a generator neural network, the generator neural network implemented using the one or more computing systems;
generating, by the generator neural network, a generated training image based upon the latent space representation of the input training image;
sampling a latent code from a latent space associated with the generator neural network, wherein sampling the latent code from the latent space comprises:
sampling from a first latent space to obtain an initial latent code, and
transforming the initial latent code to an augmented latent space to generate the sampled latent code;
providing the sampled latent code as input to the generator neural network;
generating, by the generator neural network, a synthetic training image based on the sampled latent code;
providing the sampled latent code as input to the encoder neural network;
producing, by the encoder neural network, a synthetic training code based upon the sampled latent code;
updating the encoder neural network by minimizing a loss between the generated training image and the input training image, and the synthetic training code and the sampled latent code to produce a trained encoder neural network; and
providing the trained encoder neural network and the generator neural network for generating an output image for display.

14. The non-transitory computer-readable medium of claim 13, wherein the loss comprises a first component comprising the input training image weighted by a first value and a second component comprising the synthetic training code weighted by a second value different from the first value.

15. The non-transitory computer-readable medium of claim 13, the operations further comprising:
generating, by a generator neural network, a synthetic training image based upon the sampled latent code; and
producing, by the encoder neural network, the synthetic training code based upon the synthetic training image.

16. The non-transitory computer-readable medium of claim 13, the operations further comprising sampling in a neighborhood of the transformed initial latent code to generate the sampled latent code.

17. The non-transitory computer-readable medium of claim 15, the operations further comprising:
providing a second input training image as input to the encoder neural network to produce a latent space representation of the second input training image;
sampling a second latent code from the latent space by sampling in a neighborhood of the latent space representation of the second input training image; and
retraining the encoder neural network using the second sampled latent code.

18. The non-transitory computer-readable medium of claim 17, the operations further comprising:
providing a third input training image as input to the encoder neural network to produce a latent space representation of the third input training image;
generating a third generated training image by providing the latent space representation of the third input training image as input to the generator neural network;
minimizing a loss between the latent space representation of the third input training image and the third generated training image to optimize the latent space representation of the third input training image;
sampling a third latent code from the latent space by sampling in a neighborhood of the optimized latent space representation of the third input training image; and
retraining the encoder neural network using the third sampled latent code.

* * * * *